US012631299B1

(12) United States Patent
Yan et al.

(10) Patent No.: US 12,631,299 B1

(45) Date of Patent: May 19, 2026

(54) LIGHT EMITTING DEVICES

(71) Applicant: HANGZHOU HANGKE OPTOELECTRONICS CO., LTD., Hangzhou (CN)

(72) Inventors: Qianjun Yan, Hangzhou (CN); Hai Wang, Hangzhou (CN); Zhaozhang Zheng, Hangzhou (CN); Chuansheng Yan, Hangzhou (CN)

(73) Assignee: HANGZHOU HANGKE OPTOELECTRONICS CO., LTD., Hangzhou (CN)

( * ) Notice: Subject to any disclaimer, the term of this patent is extended or adjusted under 35 U.S.C. 154(b) by 0 days.

(21) Appl. No.: 19/023,247

(22) Filed: Jan. 15, 2025

(30) Foreign Application Priority Data

Nov. 15, 2024 (CN) ........................ 202411634622.X

(51) Int. Cl.
*F21K 9/238* (2016.01)
*F21K 9/232* (2016.01)
(Continued)

(52) U.S. Cl.
CPC .............. *F21K 9/238* (2016.08); *F21K 9/232* (2016.08); *F21V 19/0015* (2013.01);
(Continued)

(58) Field of Classification Search
CPC ...... F21K 9/232; F21K 9/238; F21V 19/0015; F21V 19/0035
See application file for complete search history.

(56) References Cited

U.S. PATENT DOCUMENTS 7,354,174 B1 * 4/2008 Yan .......................... F21K 9/232 362/240
10,415,763 B2 * 9/2019 Eckert ..................... F21V 29/87
(Continued)

FOREIGN PATENT DOCUMENTS

| | | |
|---|---|---|
| CN | 204240107 U | 4/2015 |
| CN | 220623726 U | 3/2024 |
| KR | 102099966 B1 | 4/2020 |

OTHER PUBLICATIONS

The Extended European Search Report in European Application No. 25192109.4 mailed on Sep. 16, 2025, 18 pages.

*Primary Examiner* — William N Harris
(74) *Attorney, Agent, or Firm* — PORUS IP LLC

(57) ABSTRACT

Alight emitting device, comprising a light-transmitting carrier and a light emitting body. The light-transmitting carrier is formed with a holding cavity, a plurality of connecting points are disposed on an inner wall of the holding cavity, and the light emitting body are disposed within the holding cavity by connecting with connecting points. The light emitting device cleverly utilizes the connecting points to restrain the light emitting body in the holding cavity, causing that the light emitting body is freely shaped and accurately positioned in three-dimensional space, so as to form a planar light source or a three-dimensional light source that are restrained within the holding cavity through the connecting points, thereby enhancing the visual effect of the lamps and lanterns, making the lamps and lanterns better adapt to the lighting needs of different scenes and atmospheres, and more finely controlling distribution and change of light, and creating a more comfortable and hierarchical three-dimensional lighting effect.

20 Claims, 35 Drawing Sheets

(51) Int. Cl.
*F21V 19/00* (2006.01)
*F21Y 103/10* (2016.01)
*F21Y 107/00* (2016.01)
*F21Y 107/70* (2016.01)

(52) U.S. Cl.
CPC ....... *F21Y 2103/10* (2016.08); *F21Y 2107/00* (2016.08); *F21Y 2107/70* (2016.08)

(56) References Cited

U.S. PATENT DOCUMENTS

| | | | | |
|---|---|---|---|---|
| 10,544,905 | B2 * | 1/2020 | Jiang | F21K 9/232 |
| 11,619,357 | B1 * | 4/2023 | Yan | F21V 23/001<br>362/311.02 |
| 11,662,065 | B1 * | 5/2023 | Yan | H10H 20/853<br>438/15 |
| 11,690,148 | B2 * | 6/2023 | Jiang | F21V 15/04<br>252/582 |
| 2015/0069442 | A1 * | 3/2015 | Liu | H10H 20/8513<br>257/98 |
| 2016/0238199 | A1 * | 8/2016 | Yeung | F21K 9/90 |
| 2018/0347802 | A1 | 12/2018 | Fu et al. | |
| 2019/0056095 | A1 | 2/2019 | Li | |
| 2019/0368667 | A1 * | 12/2019 | On | F21K 9/238 |
| 2022/0221112 | A1 | 7/2022 | Van Bommel et al. | |
| 2023/0243486 | A1 | 8/2023 | Yan et al. | |
| 2024/0369195 | A1 * | 11/2024 | Chen | F21V 23/04 |

* cited by examiner

LIGHT EMITTING DEVICES

CROSS-REFERENCE TO RELATED APPLICATIONS

This application claims priority to Chinese patent application No. 202411634622.X, filed on Nov. 15, 2024, the contents of which are hereby incorporated herein by reference in its entirety.

TECHNICAL FIELD

The present disclosure relates to the field of lighting technology, and in particular, to a light emitting device.

BACKGROUND

In the prior art, flexible light emitting diode (LED) filament is typically arranged in a light-transmitting carrier, but the common settings are limited to hanging vertically in the light-transmitting carrier, or straightening the filament after mechanically positioning both ends of the flexible LED filament, or a middle part of the flexible LED filament falling freely and placing the filament in the light-transmitting carrier. These traditional arrangements clearly have shortcomings, which are difficult to adapt to the complex and changing lighting design needs and cannot achieve the free shaping and accurate positioning of the flexible LED filament in the three-dimensional space.

These traditional arrangement not only seriously restricts the enhancement of the visual effect and artistic expression of the lamps and lanterns, but also fails to meet deep expectations of designers for delicate control of the light environment in the scene needing to create a specific atmosphere or emphasize spatial hierarchy.

Therefore, in response to the shortcomings of the prior art, there is an urgent need for an innovative design solution to break through these limitations and bring more possibilities and creative space to the design of lamps and lanterns.

SUMMARY

One or more embodiments of the present disclosure provide a light emitting device, comprising a light-transmitting carrier and a light emitting body. The light-transmitting carrier is formed with a holding cavity, a plurality of connecting points are disposed on an inner wall of the holding cavity, and the light emitting body is disposed within the holding cavity by connecting with each of the plurality of connecting points.

BRIEF DESCRIPTION OF THE DRAWINGS

This present disclosure will be further illustrated by way of exemplary embodiments, which will be described in detail by means of the accompanying drawings. These embodiments are not limiting, and in these embodiments, the same numbering denotes the same structure, wherein.

DETAILED DESCRIPTION

Figure 1:
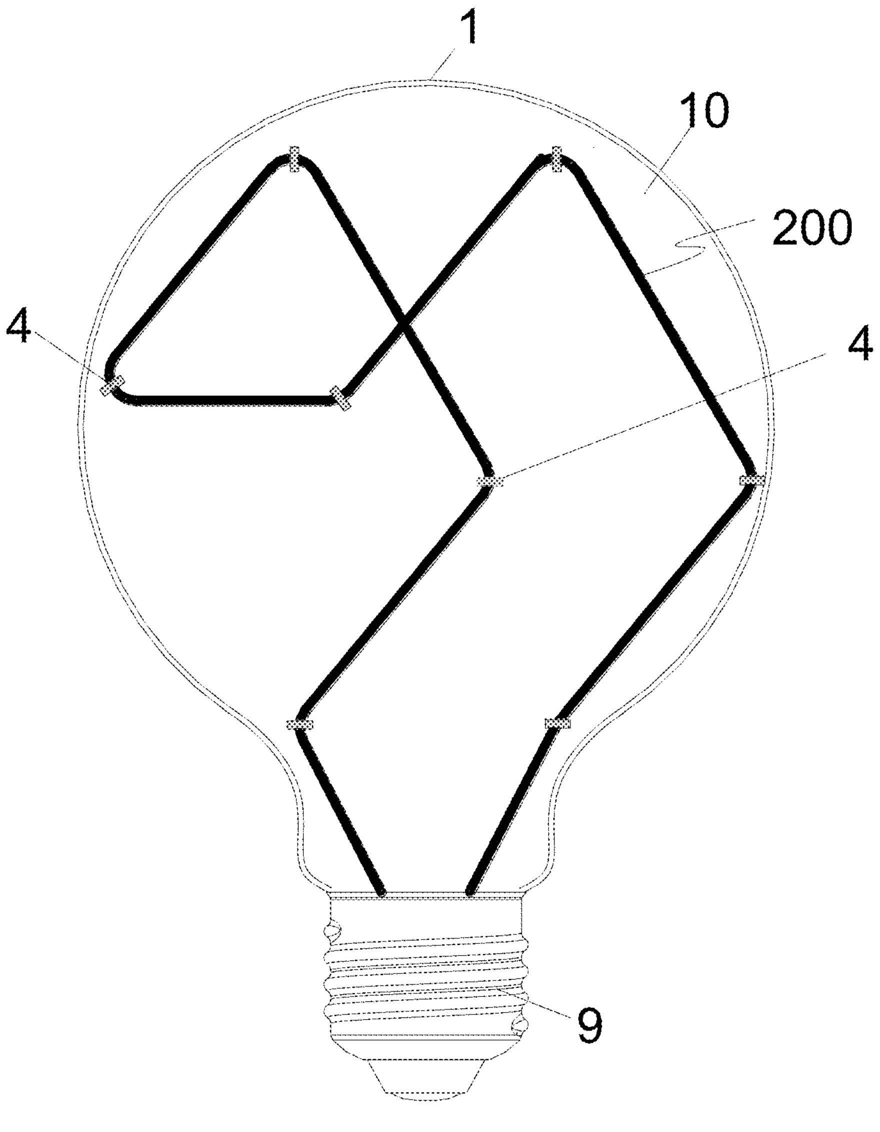
FIG. 1 is a schematic diagram illustrating a structure of a light emitting device according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

In order to make the technical problem to be solved, the technical solution, and the beneficial effect of the present disclosure clearer and more understandable, the following combines the accompanying drawings and the embodiments to further describe the present disclosure in detail. It should be understood that the specific embodiments described herein are only for explaining the present disclosure and are not intended to limit the present disclosure.

Figure 2:
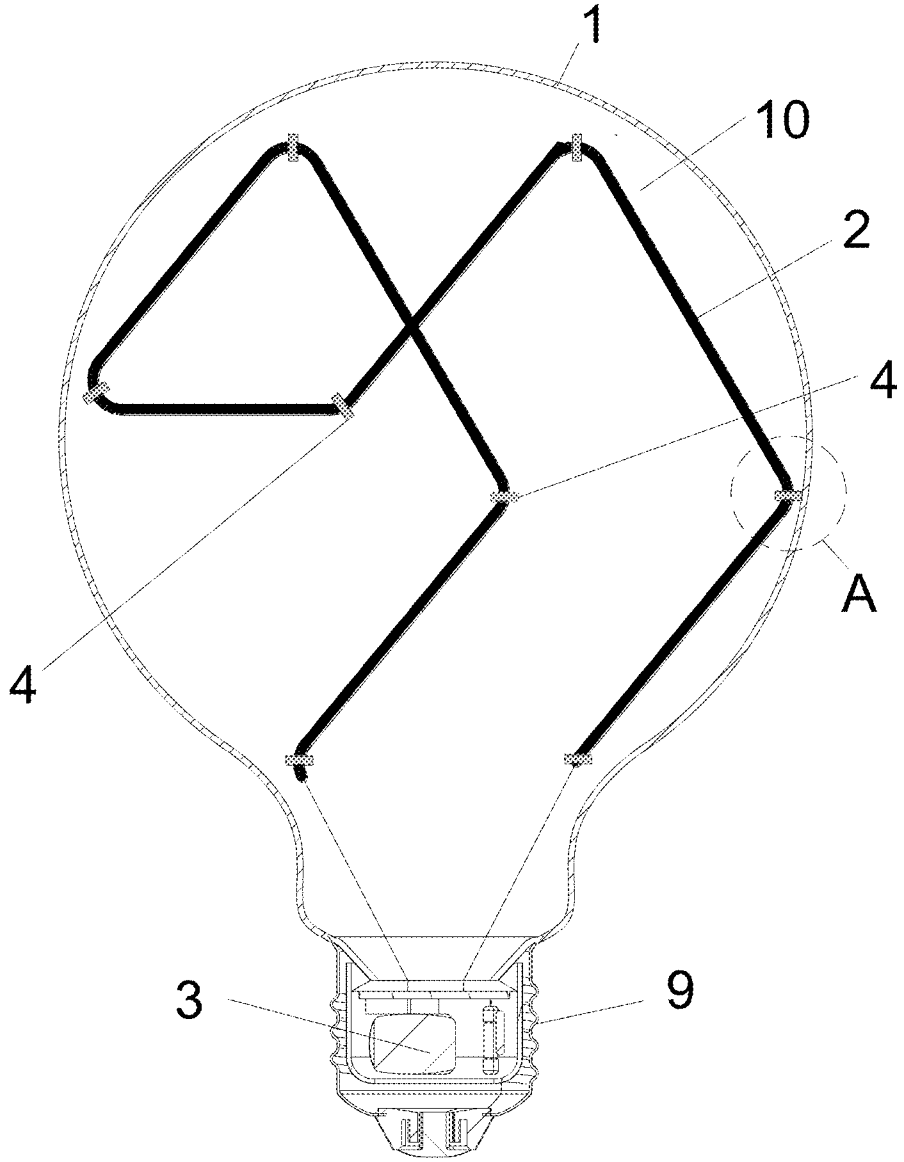
FIG. 2 is a section view of FIG. 1.
Figure 3:
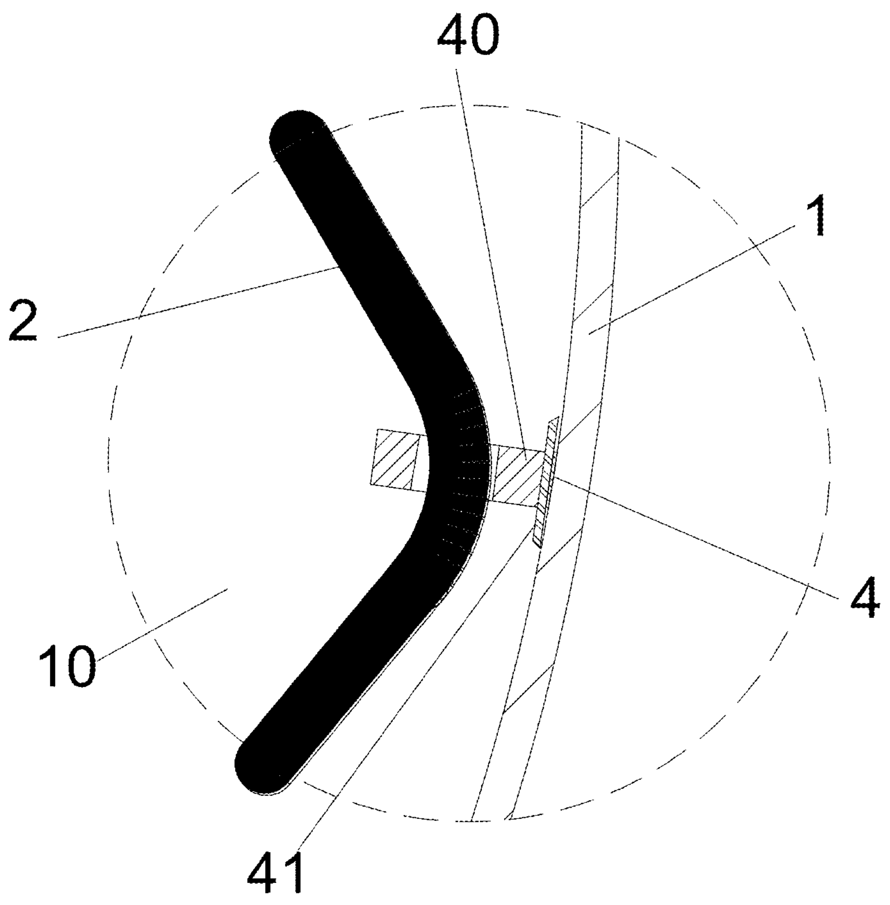
FIG. 3 is an enlarged view of point A in FIG. 2.

FIG. 1 is a schematic diagram illustrating a structure of a light emitting device according to some embodiments of the present disclosure. FIG. 2 is a section view of FIG. 1. FIG. 3 is an enlarged view of point A in FIG. 2.

As shown in FIG. 1, FIG. 2, and FIG. 3, the light emitting device includes a light-transmitting carrier 1 and a light emitting body 200, the light-transmitting carrier 1 is formed with a holding cavity 10, a plurality of connecting points 4 are disposed on an inner wall of the holding cavity 10, and the light emitting body 200 is disposed within the holding cavity 100 by connecting with each of the plurality of connecting points 4. In some embodiments, the light emitting body 200 is restrained via each of the plurality of connecting points 4 and disposed in the holding cavity 10.

The light-transmitting carrier 1 is configured as a mounting base for mounting and supporting the light emitting body 200. The light-transmitting carrier 1 forms the holding cavity 10, so that the light emitting body 200 forms a stable structure within the holding cavity 10. In some embodiments, at least a portion of the light emitted by the light emitting body 200 may shine outwardly through the light-transmitting carrier 1.

In some embodiments, the holding cavity 10 may be filled with an inert gas.

The light emitting body 200 may be configured to emit light. For example, the light emitting body 200 emits light under energized conditions. In some embodiments, the light emitting body 200 may include a tungsten wire, an iridium wire, etc.

The connecting points 4 refer to points at which an inner wall of the light-transmitting carrier 1 is connected to the light emitting body 200. In some embodiments, the locations of the connecting points 4 may be preset as desired. In some embodiments, the light emitting body 200 may be connected to the plurality of connecting points 4 in sequence to form different shapes, thereby changing the layout and shaping of the light emitting body 200 and forming different light irradiation effects.

In some embodiments, the light emitting body 200 and the plurality of connecting points 4 may be connected in a plurality of manners. For example, the plurality of manners may include at least one of snap-fitting, bonding, welding, etc.

In some embodiments, the light emitting body 200 includes at least one flexible light emitting diode (LED) filament 2, and at least one flexible LED filament 2 is wrapped around each of the plurality of connecting points 4 and respectively connected to each of the plurality of connecting points 4 to be disposed within the holding cavity 10. In some embodiments, each flexible LED filament 2 is wrapped around each of the plurality of connecting points 4 and restrained by each of the plurality of connecting points 4 to be disposed within the holding cavity 10.

The flexible LED filament 2 is flexible, which is capable of being bent and folded to form a plurality of shapes. In some embodiments, the flexible LED filament 2 is connected to the plurality of connecting points 4 at the bending or folding positions to form a planar light source or a three-dimensional light source.

Figure 4:
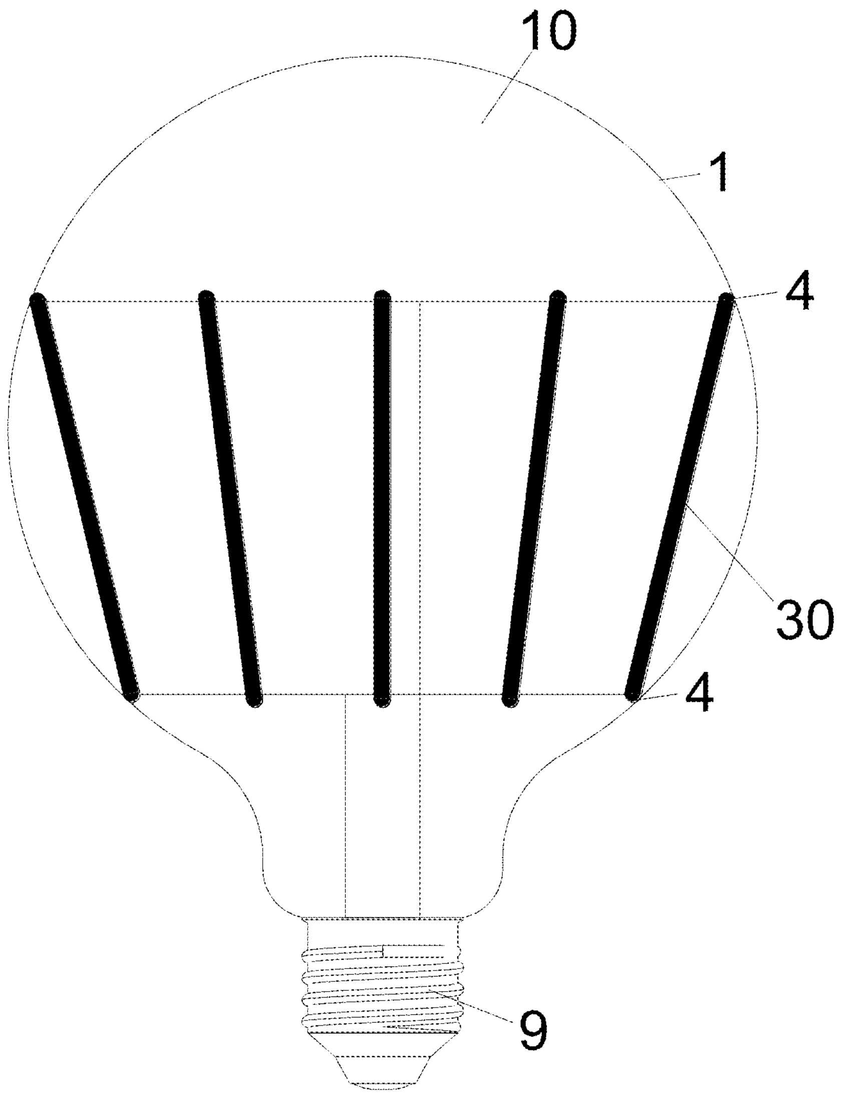
FIG. 4 is a schematic diagram illustrating a distribution of a plurality of straight LED filaments according to some embodiments of the present disclosure.
Figure 5:
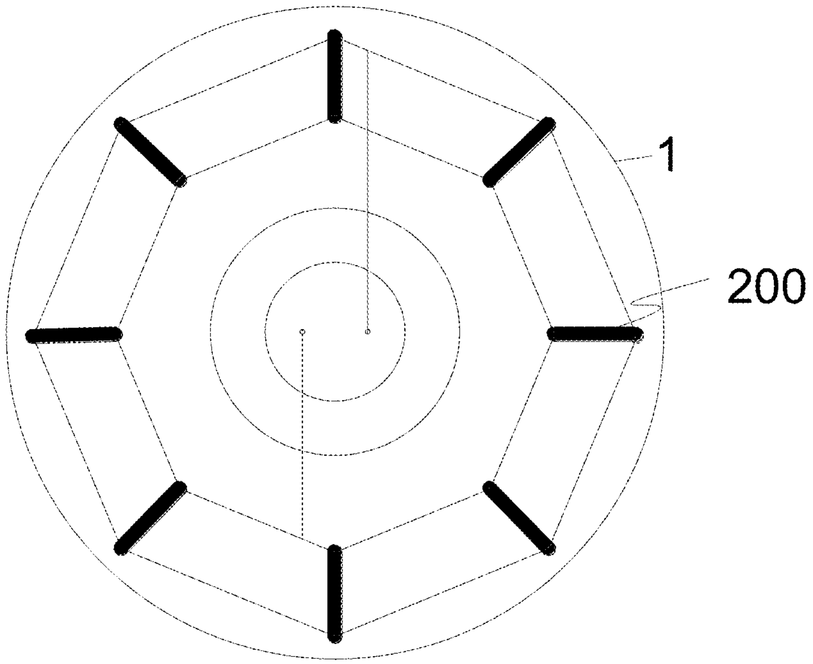
FIG. 5 is a top view of FIG. 4.

FIG. 4 is a schematic diagram illustrating a distribution of a plurality of straight LED filaments according to some embodiments of the present disclosure. FIG. 5 is a top view of FIG. 4.

In some embodiments, as shown in FIG. 4 and FIG. 5, the light emitting body 200 includes a plurality of straight LED filaments 30 connected to each other in series, in parallel, or in series-parallel, and each of the plurality of straight LED filaments is connected to the holding cavity 10 through the plurality of connecting points 4. In some embodiments, the light emitting body 200 is a plurality of straight LED filaments 30 connected to each other in series, parallel, or series-parallel, and each of the plurality of straight LED filaments 30 is correspondingly restrained within the holding cavity 10 by each of the plurality of connecting points 4.

The straight LED filaments 30 refer to straight filaments. In some embodiments, the plurality of straight LED filaments 30 may be connected to each other by conductive wires to form a series, parallel, or series-parallel connection.

Some embodiments of the present disclosure provide the light emitting device that can form a plurality of desired shapes by connecting the light emitting body with the plurality of connecting points to meet different needs. The plurality of connecting points can position the light emitting body and improve the positioning and installation accuracy of the light emitting body.

Figure 6:
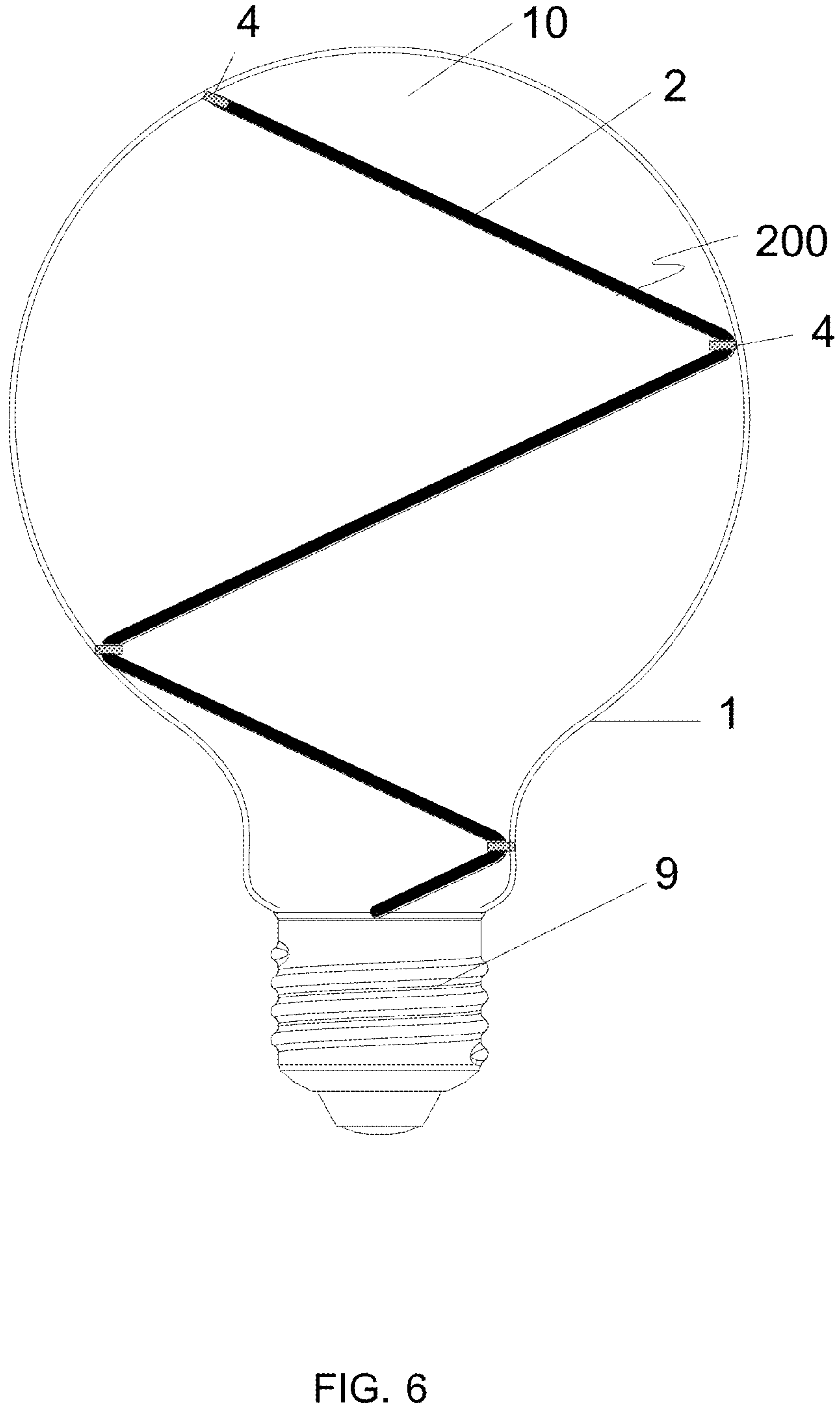
FIG. 6 is a schematic diagram illustrating a planar structure that a light emitting body forms according to some embodiments of the present disclosure.
Figure 7:
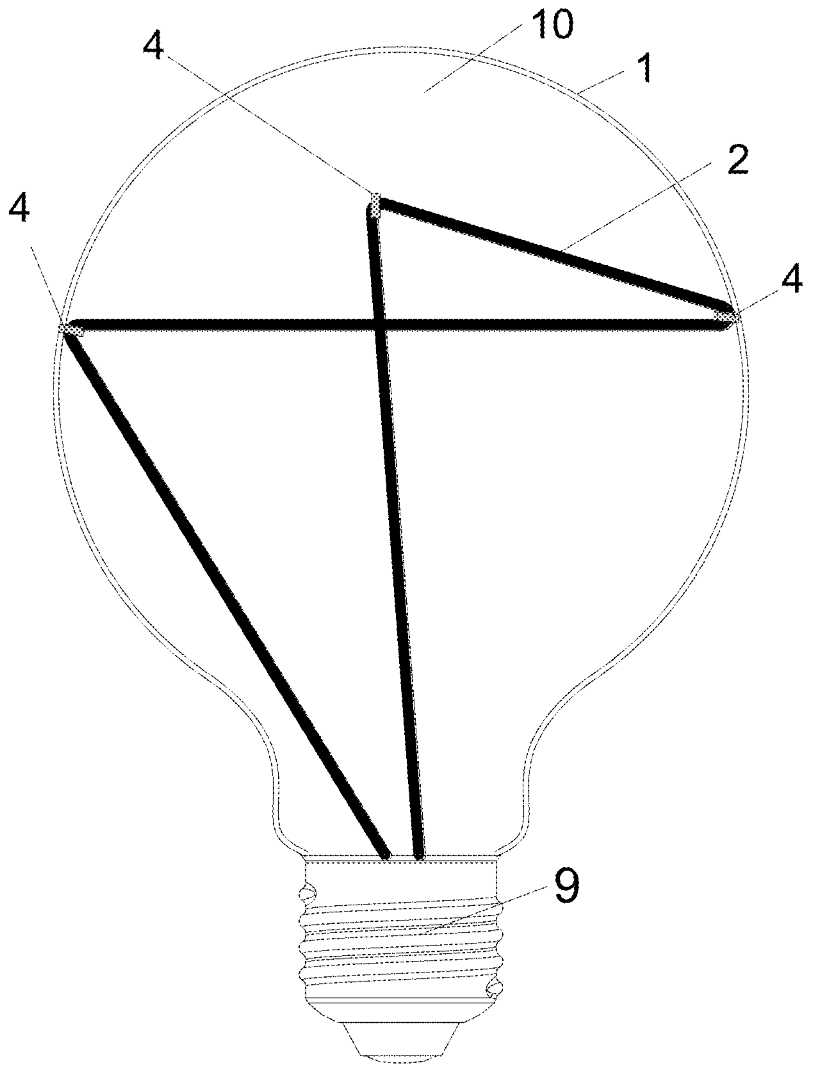
FIG. 7 is another schematic diagram illustrating a planar structure that a light emitting body forms according to some embodiments of the present disclosure.
Figure 8:
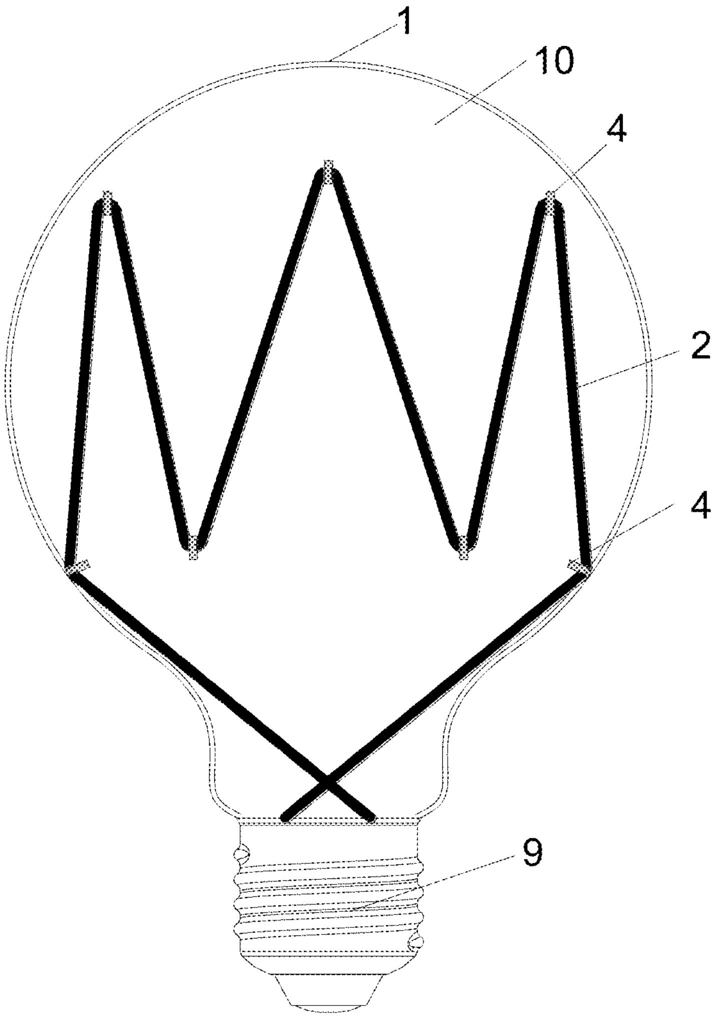
FIG. 8 is another schematic diagram illustrating a planar structure that a light emitting body forms according to some embodiments of the present disclosure.

FIG. 6 is a schematic diagram illustrating a planar structure that a light emitting body forms according to some embodiments of the present disclosure. FIG. 7 is another schematic diagram illustrating a planar structure that a light emitting body forms according to some embodiments of the present disclosure. FIG. 8 is another schematic diagram illustrating a planar structure that a light emitting body forms according to some embodiments of the present disclosure.

In some embodiments, as shown in FIG. 6, FIG. 7, and FIG. 8, the light emitting body 200 may form a planar structure or a three-dimensional structure.

The planar structure refers to a structure formed by the light emitting body 200 located in the same plane. For example, one or more flexible LED filaments 2 are located in the same plane within the holding cavity 10 to form the planar structure. As another example, one or more straight LED filaments 30 are located in the same plane within the holding cavity 10 to form a planar structure. This layout allows the light emitting body 200 to be spread out in a two-dimensional plane and fixed and supported by the plurality of connecting points 4, thereby forming a stable and uniform planar light source. Because of the flexibility and bendability of the flexible LED filament 2, and the flexible setting of the plurality of connecting points 4, the planar light source may adapt to various shapes and sizes of the light-transmitting carrier 1. The planar structure can optimize the energy efficiency of the light source and reduce energy consumption through the reasonable layout and support of the plurality of connecting points. The straight LED filaments are accurately laid out on the same plane and stabilized by the plurality of connecting points, which can form a continuous and uniform planar light source. The regular arrangement of the plurality of straight LED filaments in the plane ensures a uniform distribution of light, which can reduce light spots and shadows and improve consistency and comfort of the light.

In some embodiments, one or more flexible LED filaments 2 are wrapped around each of the plurality of connecting points 4 in the same plane within the holding cavity 10 to form the planar light source.

In some embodiments, the plurality of straight LED filaments 30 are restrained in the same plane of the holding cavity 10, with each of the plurality of connecting points 4 as a support point, to form the planar light source.

In some embodiments, one or more flexible LED filaments 2 are wrapped around each of the plurality of connecting points 4 and intersect in space within the holding cavity 10 using each of the plurality of connecting points 4 as a turning point to form the three-dimensional light source.

In some embodiments, the plurality of straight LED filaments 30 are restrained within the holding cavity 10 with each of the plurality of connecting points as a support point and interlaced in three-dimensional space to form the three-dimensional light source.

Figure 9:
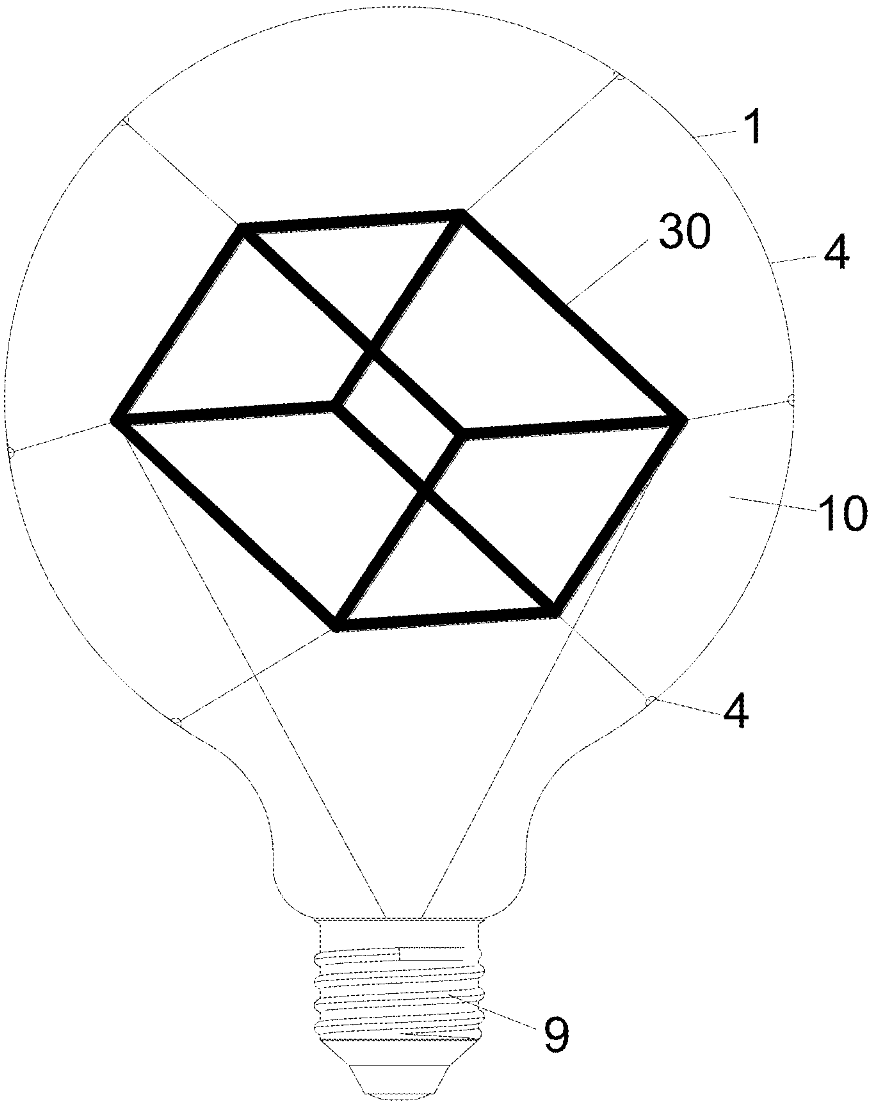
FIG. 9 is a schematic diagram illustrating a three-dimensional structure that a light emitting body forms according to some embodiments of the present disclosure.

FIG. 9 is a schematic diagram illustrating a three-dimensional structure that a light emitting body forms according to some embodiments of the present disclosure.

The three-dimensional structure refers to a structure formed by the light emitting body 200 located in a plurality of planes.

For example, the one or more flexible LED filaments 2 are located in different planes respectively after being connected to the plurality of connecting points 4. As another example, as shown in FIGS. 4, 5, and 9, the plurality of straight LED filaments 30 are located in different planes respectively after being connected to the plurality of connecting points 4, In some embodiments, different planes may include a plurality of relationships. For example, different planes may include at least one of parallel, intersecting, perpendicular, etc.

The three-dimensional structure enables the flexible LED filaments 2 or the straight LED filaments 30 to unfold in a three-dimensional space, thereby forming a three-dimensional lighting effect, so that the light source presents a rich sense of hierarchy and three-dimensionality in a three-dimensional space to form a three-dimensional lighting effect with depth and hierarchy, which can fully utilize space inside the light-transmitting carrier to improve the density and brightness of the light source, while reducing the occupation of the lighting space, making the lighting design more compact and efficient. The three-dimensional light source has a stronger sense of three-dimensionality and dynamics, which can attract people's attention, enhance the visual impact of the space and sense of art, and improve the user experience.

In some embodiments, the light-transmitting carrier 1 may be made of a plurality of materials. For example, the materials may be glass, light-transmissive plastic, or a combination thereof. The glass may provide a clear and translucent display window for the light emitting body 200 inside the light-transmitting carrier 1, while protecting the light emitting body 200 from disruptions of the outside environment. In some embodiments, the light-transmitting carrier 1 may be a braided structure or a skeletonized structure. In some embodiments, the light-transmitting carrier 1 includes a plurality of shapes. For example, the plurality of shapes may include a spherical shape, a cylindrical shape, a polyhedral shape, or a combination thereof. The shape may be set up as desired to create a plurality of lighting effects. The choice of material for the glass or the light-transmitting plastic ensures good transmission of light while providing sufficient structural strength. The braided structure or the skeletonized structure not only allows light to pass through to create a soft and mottled light effect, but also provides a degree of protection for the light emitting body 200.

In some embodiments, the light-transmitting carrier 1 includes a glass blister, a plastic blister, and a light-transmitting cover shell made of the glass or the light-transmitting plastic, and a braided or skeletonized mesh cover formed by iron, fabric, bamboo, wood, or plastic.

In some embodiments, at least one flexible LED filament 2 is in a tensioned state.

The tensioned state refers to a state in which at least one flexible LED filament 2 remains taut due to continuous tension. In some embodiments, at least one flexible LED filament 2 is subjected to a tensile force by connection with the plurality of connecting points 4. By tensioning at least one flexible LED filament, it is possible to improve the stability and positioning accuracy of at least one flexible LED filament. When at least one flexible LED filament forms a complex structure, it is possible to improve the stability of the complex structure to ensure that the lighting effect is stable.

In some embodiments, at least one flexible LED filament 2 is in a multi-segmented sequential taut structure after turning at each of the plurality of connecting points.

In some embodiments, the light emitting body 200 is welded or bonded to the plurality of connecting points 4. The welding may include tin soldering. The bonding may include bonding by glue.

In some embodiments, at least one flexible LED filament 2 or the plurality of straight LED filaments 30 are connected to the connecting point 4 at each corresponding location by soldering or bonding using glue.

Figure 10:
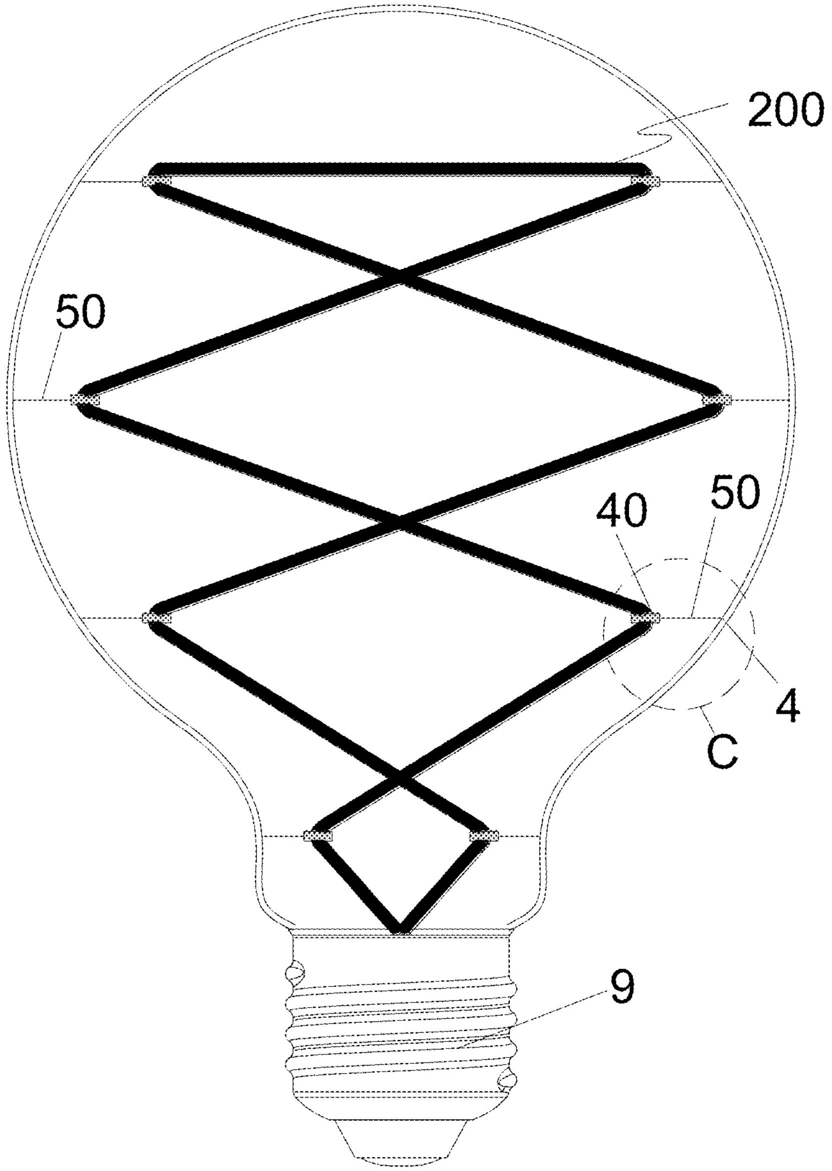
FIG. 10 is a schematic diagram illustrating a structure of a hauling clasp according to some embodiments of the present disclosure.
Figure 11:
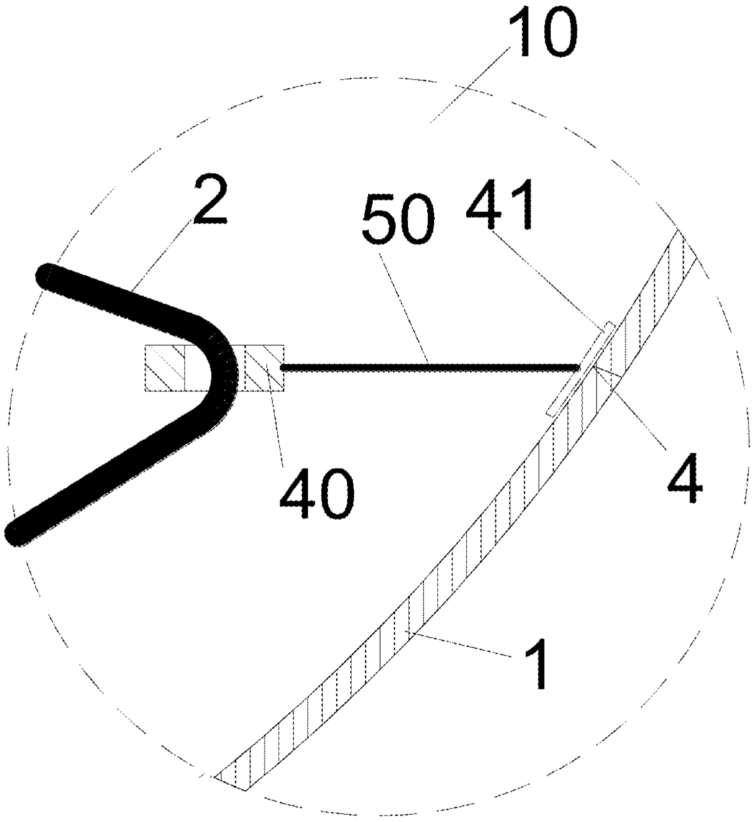
FIG. 11 is an enlarged view of point C in FIG. 10.

FIG. 10 is a schematic diagram illustrating a structure of a hauling clasp according to some embodiments of the present disclosure. FIG. 11 is an enlarged view of point C in FIG. 10.

In some embodiments, as shown in FIG. 10 and FIG. 11, each of the plurality of connecting points 4 is provided with a hauling clasp 40, and the light emitting body 200 is threaded through and/or connected to the hauling clasp 40. In some embodiments, each of the plurality of connecting points is provided with the hauling clasp 40, and at least one flexible LED filament 2 or the straight LED filament 30 is threaded through and/or connected to the hauling clasp 40 at each corresponding position, respectively.

The hauling clasp 40 is configured to connect with at least a portion of the light emitting body 200. In some embodiments, the hauling clasp 40 protrudes inwardly with respect to the inner surface of the light-transmitting carrier 1. In some embodiments, the light emitting body 200 is connected to the hauling clasp 40 in a plurality of manners. For example, the plurality of manners may include at least one of snap-fitting, welding, bonding, etc. In some embodiments, the light emitting body 200 may penetrate through the hauling clasp 40 or a portion of the hauling clasp 40.

By adopting the hauling clasp to connect with the light emitting body, it is possible to avoid the light emitting body from being directly connected to the inner surface of the light-transmitting carrier, and the hauling clasp can be designed in the plurality of shapes according to the need to facilitate positioning and installing of the light emitting body, which is conducive to further improving the positioning accuracy and installation stability of the light emitting body and enhances the layout and shaping possibilities of the light emitting body.

In some embodiments, the hauling clasp 40 is welded or bonded to the connecting point 4. In some embodiments, the hauling clasp 40 is connected (e.g., bonded) to the connecting point 4 via a patch 41.

In some embodiments, the hauling clasp 40 is connected to the connecting point 4 via a hauling wire 50.

The hauling wire 50 is configured to connect between the hauling clasp 40 and the connecting point 4, so as to form a certain gap between the hauling clasp 40 and the connecting point 4, avoiding that a distance between the hauling clasp 40 and the connecting point 4 is too close, resulting in interference of the inner surface of the light-transmitting carrier 1 to the light emitting body 200 when installing the light emitting body 200, thereby making the installation of the light emitting body 200 more convenient.

In some embodiments, the hauling wire 50 includes a resilient connector or a rigid connecting post. The resilient connector includes a rubber band, a spring, etc. In some embodiments, the resilient connector and the rigid connecting post may be made of a transparent material, thereby reducing the shadow of the hauling wire 50.

In some embodiments, as shown in FIG. 11, an end of the hauling wire 50 is connected to the hauling clasp 40 and the other end of the hauling wire 50 is connected to the connecting point 4 via the patch 41.

The patch 41 is a sheet-like structure, which is able to increase the contact area with the connecting point 4, thereby improving the strength and reliability of the connection with the connecting point 4 and facilitating the connection of the patch 41 with the connecting point 4. In some embodiments, the patch 41 is bonded to the connecting point 4 by glue. In some embodiments, the patch 41 may be correspondingly connected to a plurality of hauling wires 50 to increase a count of times that the flexible LED filament 2 can be bent or folded, or increase a count of the straight LED filaments 30 that can be arranged, thereby increasing the diversity of the light emitting body.

In some embodiments, the patch 41 is made of a transparent material to reduce shadow of the patch 41.

In some embodiments, the patch 41 may also be of an opaque structure, and the patch 41 may be of a plurality of shapes, such as a cartoon, a flower, a geometric, etc., to allow for the formation of specific shadows to alter the light effect.

Figure 12:
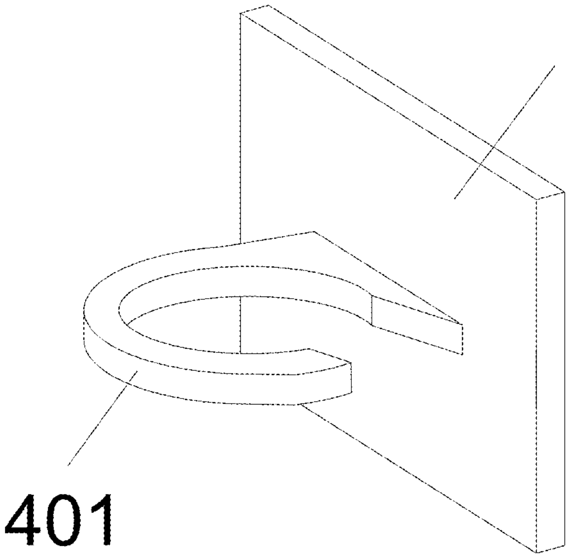
FIG. 12 is a schematic diagram illustrating a structure of a hauling clasp according to some embodiments of the present disclosure.
Figure 13:
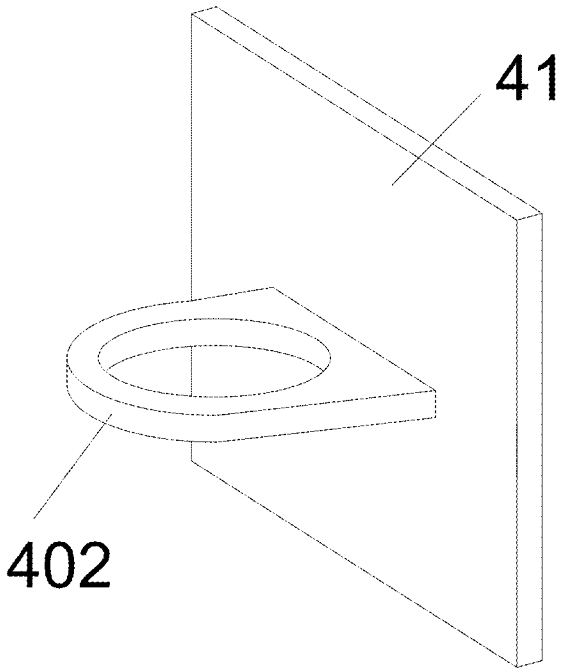
FIG. 13 is another schematic diagram illustrating a structure of a hauling clasp according to some embodiments of the present disclosure.
Figure 14:
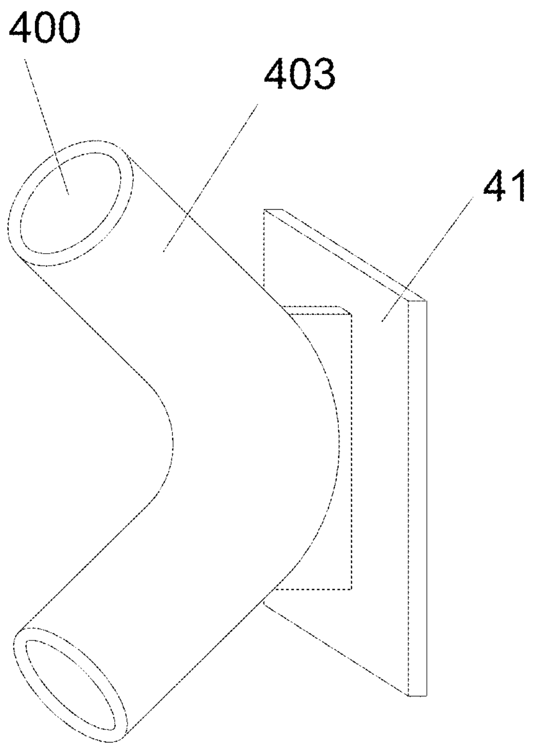
FIG. 14 is another schematic diagram illustrating a structure of a hauling clasp according to some embodiments of the present disclosure.
Figure 15:
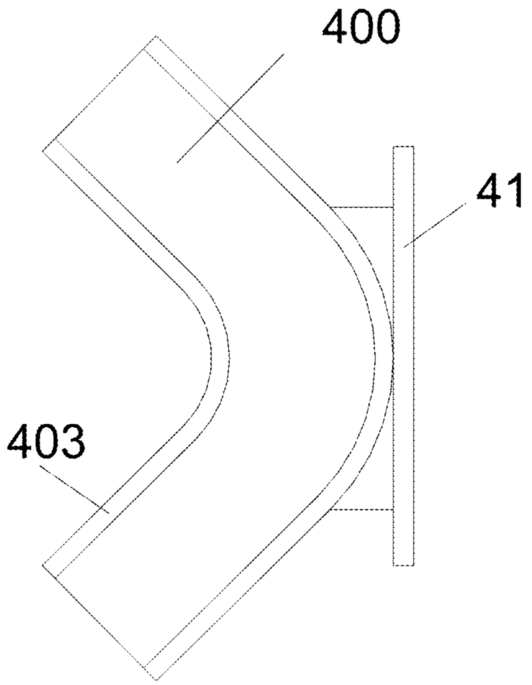
FIG. 15 is a section view of FIG. 14.

FIG. 12 is a schematic diagram illustrating a structure of a hauling clasp according to some embodiments of the present disclosure. FIG. 13 is another schematic diagram illustrating a structure of a hauling clasp according to some embodiments of the present disclosure. FIG. 14 is another schematic diagram illustrating a structure of a hauling clasp according to some embodiments of the present disclosure. FIG. 15 is a section view of FIG. 14.

As shown in FIG. 12, FIG. 13, and FIG. 14, the hauling clasp 40 is at least one of a pulling hook 401, a ring clasp 402, or a curved sleeve 403. At least one flexible LED filament 2 threads through and/or is connected to at least one of the pulling hook 401, the ring clasp 402, or the curved sleeve 403 at the connecting point 4. The curved sleeve 403 is provided with an arcuate channel 400 for threading at least one flexible LED filament 2.

As shown in FIG. 12, a C-shaped slot is formed on the pulling hook 401, and at least a portion of the light emitting body 200 is capable of snapping to the C-shaped slot. The pulling hook 401 is suitable for scenarios where tight fixation is required and there is a clear requirement for the direction of at least one flexible LED filament 2.

As shown in FIG. 13, a through hole is formed on the ring clasp 402, and the light emitting body 200 is able to thread through the through hole and snap to the ring clasp 402. The ring clasp 402 is suitable for situations where at least one flexible LED filament 2 is required to be freely threaded in a plurality of directions.

As shown in FIG. 14 and FIG. 15, the curved sleeve 403 refers to a sleeve structure with an arc-shaped axis and the arcuate channel 400 coaxial with the arc-shaped axis provided inside. The light emitting body 200 is capable of threading through the arcuate channel 400 of the curved sleeve 403 and snapping to the curved sleeve 403. The curved sleeve 403 is able to limit the movement direction of at least one flexible LED filament 2 and increase the contact area between the curved sleeve 403 and the at least one flexible LED filament 2, thereby providing protection for the at least one flexible LED filament 2 to reduce the wear and tear of the at least one flexible LED filament 2. The curved sleeve 403 also enables the at least one flexible LED filament 2 to form a curved transition at a turning point, avoiding twisting or fatigue damage to the at least one flexible LED filament 2.

In some embodiments, the pulling hook 401, the ring clasp 402, and/or the curved sleeve 403 are made of transparent material, for example, a transparent plastic, to avoid forming shadow.

Figure 16:
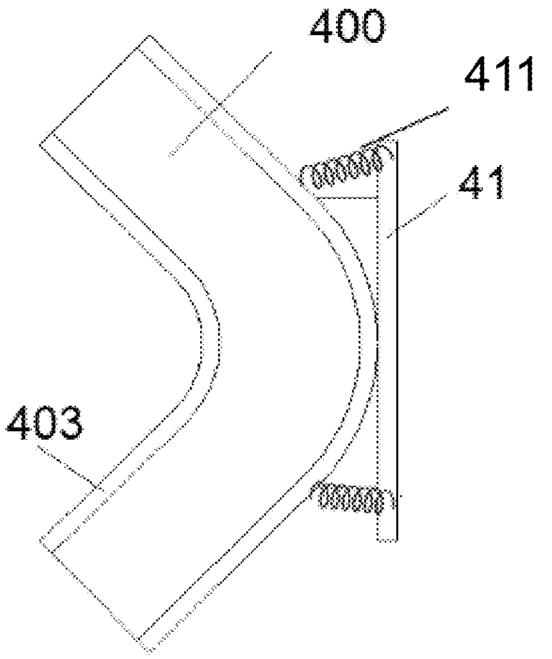
FIG. 16 is a schematic diagram illustrating a structure of a resilient connector according to some embodiments of the present disclosure.
Figure 17:
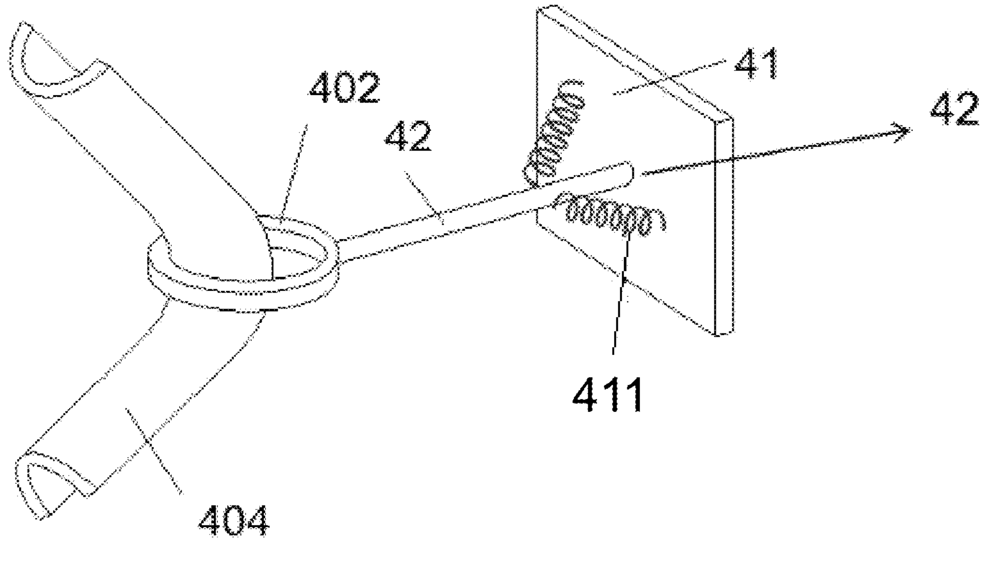
FIG. 17 is another schematic diagram illustrating a structure of a resilient connector according to some embodiments of the present disclosure.
Figure 18:
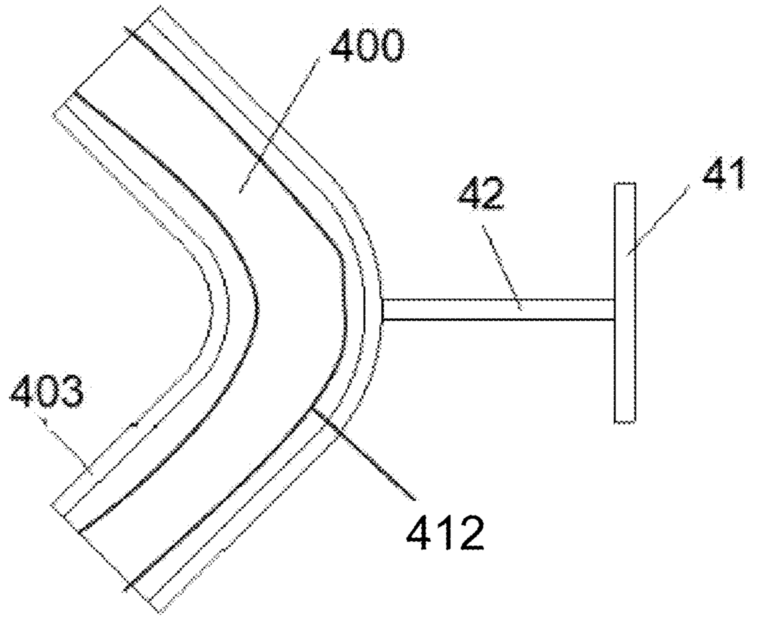
FIG. 18 is another schematic diagram illustrating a structure of a resilient connector according to some embodiments of the present disclosure.

FIG. 16 is a schematic diagram illustrating a structure of a resilient connector according to some embodiments of the present disclosure. FIG. 17 is another schematic diagram illustrating a structure of a resilient connector according to some embodiments of the present disclosure. FIG. 18 is another schematic diagram illustrating a structure of a resilient connector according to some embodiments of the present disclosure.

In some embodiments, as shown in FIG. 16, the curved sleeve 403 is connected to the patch 41 by a resilient connector.

The resilient connector refers to a connecting structure with resilience.

In some embodiments, the resilient connector may allow the curved sleeve 403 to move within a protective margin.

The protective margin is a maximum movable distance of the curved sleeve during the process of being pulled. In some embodiments, the protective margin is related to the resilience of the resilient connector. In the process of installing the at least one flexible LED filament 2, a force applied on the at least one flexible LED filament 2 is also transmitted to the curved sleeve 403, so as to drive the curved sleeve 403 to move. By providing the resilient connector, the curved sleeve 403 is allowed to undergo a certain amount of displacement to adapt to the pulling of the at least one flexible LED filament 2. After the installation of the at least one flexible LED filament 2 is completed, the curved sleeve 403 returns to its original position under the resilience of the resilient connector, and the tension may be exerted on the at least one flexible LED filament 2 to tighten the at least one flexible LED filament 2, which is conducive to improving the stability of the at least one flexible LED filament 2.

In some embodiments, the resilient connector may include a protective spring 411. In some embodiments, the protective spring 411 is connected between the curved sleeve 403 and the patch 41. In some embodiments, a plurality of the protective springs 411 are provided.

In some embodiments, as shown in FIG. 17, when the patch 41 is connected with a distance adjustment member 42, the distance adjustment member 42 may be connected to the patch 41 by at least one protective spring 411. In some embodiments, the distance adjustment member 42 and the patch 41 may not be directly connected. In some embodiments, the distance adjustment member 42 and the patch 41 may be flexibly connected, for example, the distance adjustment member 42 is connected to the patch 41 via a ball joint. The distance adjustment member 42 may be displaced within a protective margin by the protective spring 411 to adapt to the installation process of the at least one flexible LED filament 2.

In some embodiments, as shown in FIG. 18, a resilient protective layer 412 is provided inside the curved sleeve 403. The at least one flexible LED filament 2, after passing through the curved sleeve 403, contacts with the resilient protective layer 412.

The resilient protective layer 412 refers to a layer structure with flexibility. In some embodiments, the resilient connector is made of one or more materials, for example, at least one of silicone, rubber, plastic, etc. In some embodiments, the resilient protective layer 412 is adapted to an inner surface of the curved sleeve 403. In some embodiments, the resilient protective layer 412 may be a grooved structure or a tubular structure.

The resilient protective layer 412 forms a flexible contact with the at least one flexible LED filament 2, which is able to reduce the wear of the at least one flexible LED filament 2.

Figure 19:
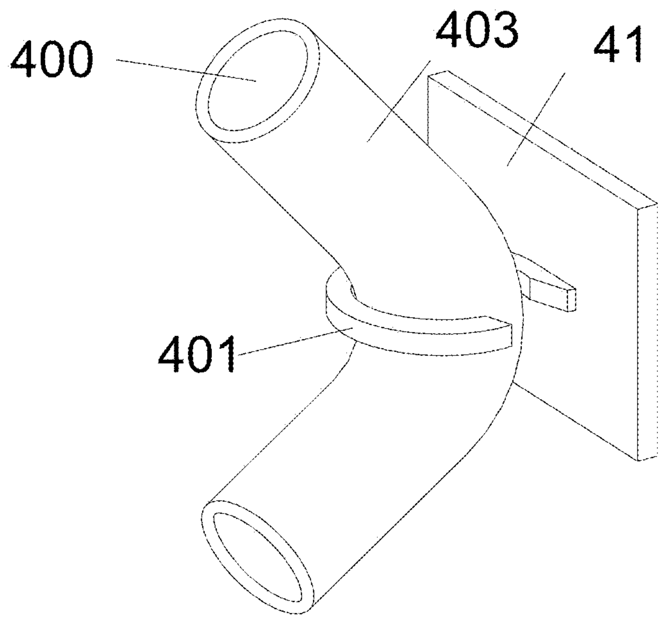
FIG. 19 is another schematic diagram illustrating a structure of a hauling clasp according to some embodiments of the present disclosure.
Figure 20:
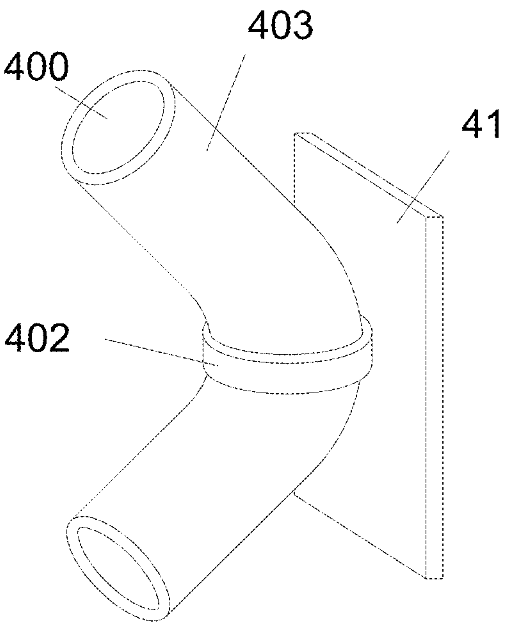
FIG. 20 is another schematic diagram illustrating a structure of a hauling clasp according to some embodiments of the present disclosure.
Figure 21:
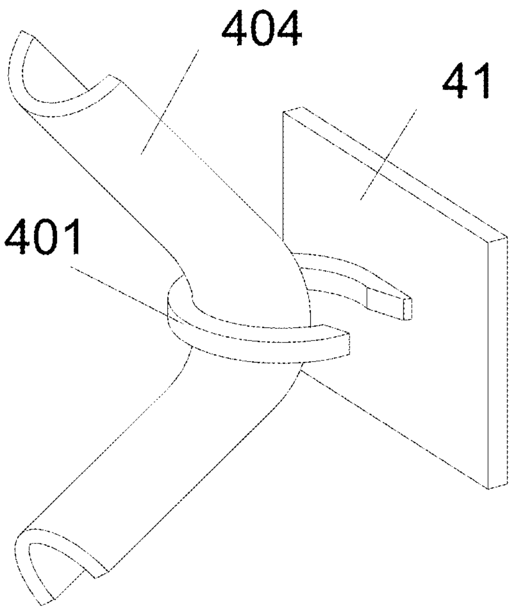
FIG. 21 is another schematic diagram illustrating a structure of a hauling clasp according to some embodiments of the present disclosure.
Figure 22:
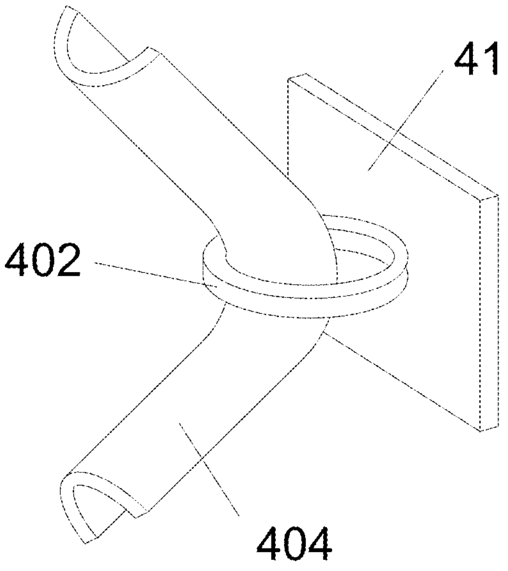
FIG. 22 is another schematic diagram illustrating a structure of a hauling clasp according to some embodiments of the present disclosure.
Figure 23:
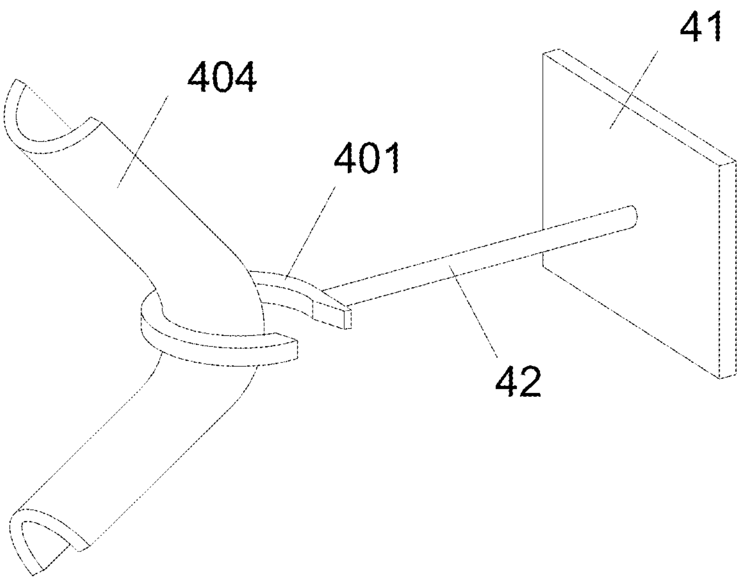
FIG. 23 is another schematic diagram illustrating a structure of a hauling clasp according to some embodiments of the present disclosure.
Figure 24:
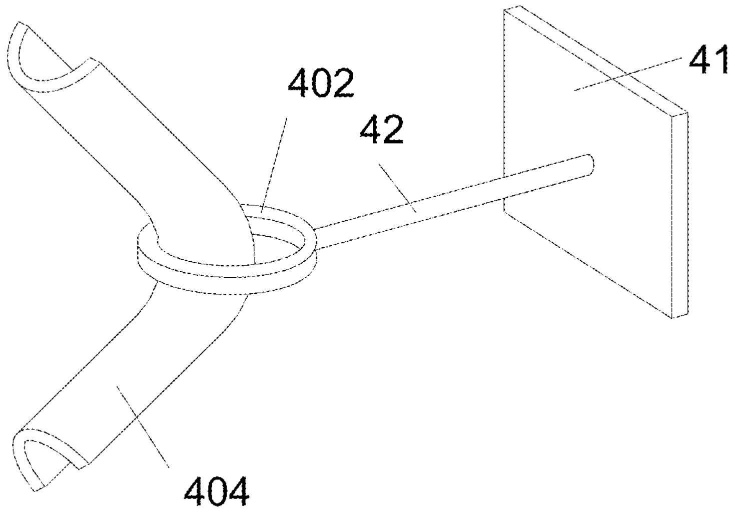
FIG. 24 is another schematic diagram illustrating a structure of a hauling clasp according to some embodiments of the present disclosure.
Figure 25:
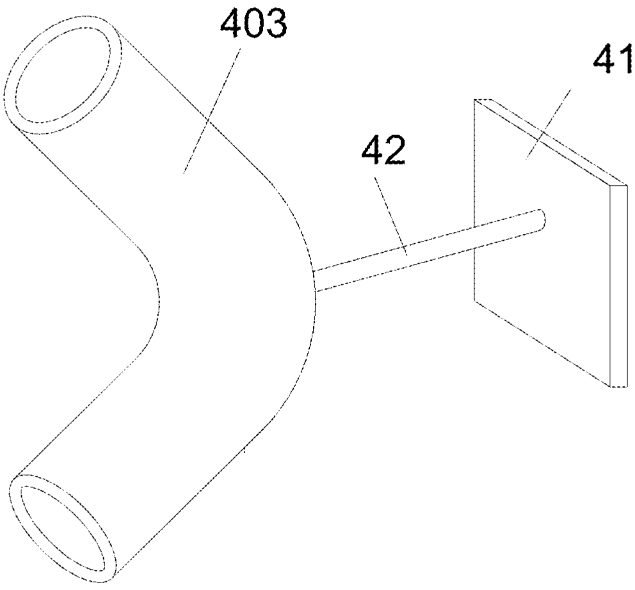
FIG. 25 is another schematic diagram illustrating a structure of a hauling clasp according to some embodiments of the present disclosure.
Figure 26:
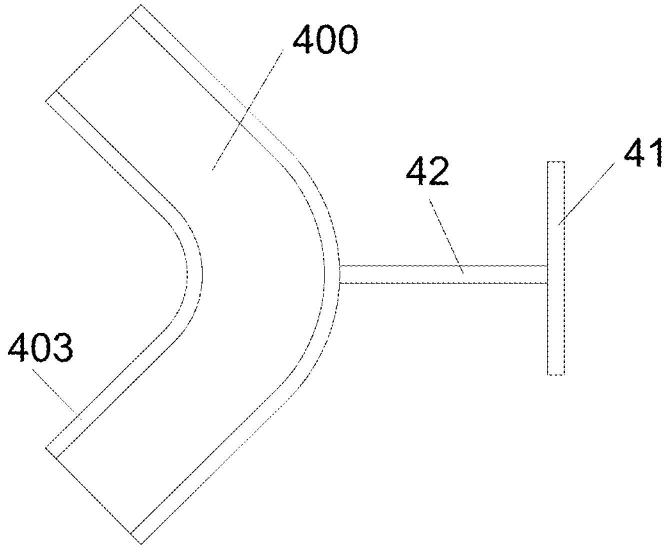
FIG. 26 is a section view of FIG. 25.
Figure 27:
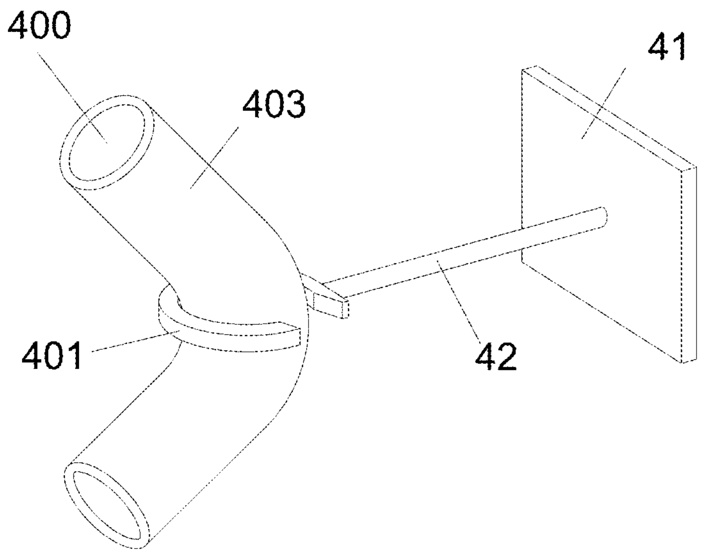
FIG. 27 is another schematic diagram illustrating a structure of a hauling clasp according to some embodiments of the present disclosure.
Figure 28:
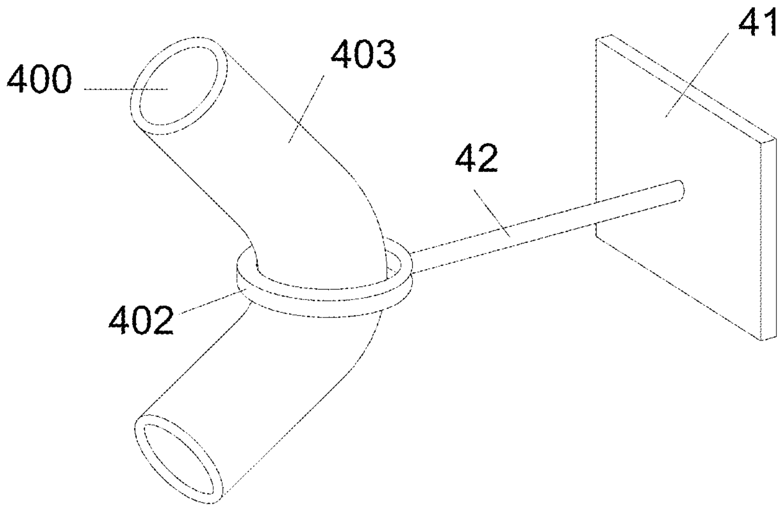
FIG. 28 is another schematic diagram illustrating a structure of a hauling clasp according to some embodiments of the present disclosure.

FIG. 19 is another schematic diagram illustrating a structure of a hauling clasp according to some embodiments of the present disclosure. FIG. 20 is another schematic diagram illustrating a structure of a hauling clasp according to some embodiments of the present disclosure. FIG. 21 is another schematic diagram illustrating a structure of a hauling clasp according to some embodiments of the present disclosure. FIG. 22 is another schematic diagram illustrating a structure of a hauling clasp according to some embodiments of the present disclosure. FIG. 23 is another schematic diagram illustrating a structure of a hauling clasp according to some embodiments of the present disclosure. FIG. 24 is another schematic diagram illustrating a structure of a hauling clasp according to some embodiments of the present disclosure. FIG. 25 is another schematic diagram illustrating a structure of a hauling clasp according to some embodiments of the present disclosure. FIG. 26 is a section view of FIG. 25. FIG. 27 is another schematic diagram illustrating a structure of a hauling clasp according to some embodiments of the present disclosure. FIG. 28 is another schematic diagram illustrating a structure of a hauling clasp according to some embodiments of the present disclosure.

In some embodiments, as shown in FIG. 21 and FIG. 22, an arcuate groove tube 404 is provided at the position where the at least one flexible LED filament 2 is wrapped around the pulling hook 401 or the ring clasp 402. When the at least one flexible LED filament 2 is wrapped through the pulling hook 401 or the ring clasp 402, the at least one flexible LED filament 2 is connected to the arcuate groove tube 404. Because the arcuate groove tube 404 is in contact with the at least one flexible LED filament 2, the supported area of the at least one flexible LED filament 2 may be increased, improving the stability of the at least one flexible LED filament 2 and reducing the wear and tear of the at least one flexible LED filament 2. The arcuate groove tube 404 can play a guiding role for the at least one flexible LED filament 2, which is convenient for the staff to make the flexible LED filament 2 to have the desired shape during production. The arcuate groove tube 404 also enables the at least one flexible LED filament 2 to form a curved transition at the turning point, avoiding twisting or a fatigue damage to the at least one flexible LED filament 2. In some embodiments, the arcuate groove tube 404 is made of transparent material, for example, a transparent plastic, to avoid forming shadow.

In some embodiments, as shown in FIG. 19 and FIG. 20, the curved sleeve 403 may be connected to the pulling hook 401 or the ring clasp 402, and when the at least one flexible LED filament 2 is wrapped around the pulling hook 401 or the ring clasp 402, the at least one flexible LED filament 2 may pass through the curved sleeve 403 and be connected to the curved sleeve 403. In this way, it is also possible to increase a supported area of the at least one flexible LED filament 2, improving stability of the at least one flexible LED filament 2 and reducing wear and tear of the at least one flexible LED filament 2. In some embodiments, the curved sleeve 403 is provided on the pulling hook 401 or the ring clasp 402 to serve as a guided feedthrough tube for the at least one flexible LED filament 2.

In some embodiments, an outer surface of the curved sleeve 403 are designed with a sharp angle at the turning point, when the light emitted from the at least one lighted flexible LED filament 2 passes through the curved sleeve 403 to form a refractive effect, thereby altering the light effect.

In some embodiments, as shown in FIGS. 23-28, the distance adjustment member 42 is provided between the hauling clasp 40 and the patch 41.

The distance adjustment member 42 may be configured to increase a distance between the hauling clasp 40 and the patch 41, for example, the distance adjustment member 42 may increase distances between the hauling clasp 401 and the patch 41, the ring clasp 402 and the patch 41, the curved sleeve 403 and the patch 41, respectively. In some embodiments, the distance adjustment member 42 includes a sling or a dangling post. In some embodiments, the sling or the dangling post is made of transparent plastic, the sling is a flexible plastic structure, and the dangling post is a rigid plastic structure. Through the use of the distance adjustment member 42, it is possible to increase the distance between the at least one flexible LED filament 2 and the light-transmitting carrier 1, so that the at least one flexible LED filament 2 exhibits a levitation effect inside the holding cavity 10, i.e., the plurality of connecting points around the at least one flexible LED filament 2 are transparent, and the at least one lighted flexible LED filament 2 except for the power supply end exhibits a suspended effect in the light-transmitting carrier 1, and is visually separated from the holding cavity 10.

Figure 29:
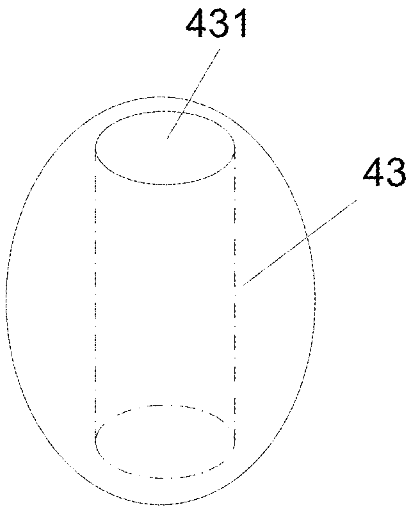
FIG. 29 is a schematic diagram illustrating a structure of a light-transmitting particle according to some embodiments of the present disclosure.

FIG. 29 is a schematic diagram illustrating a structure of a light-transmitting particle according to some embodiments of the present disclosure.

In some embodiments, each of the plurality of connecting points 4 is connected with a light-transmitting particle 43, as shown in FIG. 29.

The light-transmitting particle 43 refers to a granular structure capable of transmitting light. In some embodiments, the light emitting body 200 is connected to the light-transmitting particle 43, and a portion of the light emitted by the light emitting body 200 is capable of transmitting through the light-transmitting particle 43. In some embodiments, the light-transmitting particle 43 may be made of a plurality of materials such as at least one of crystal, silicone, rubber, plastic, glass, etc. In some embodiments, when the light-transmitting particle 43 is made of plastic, phosphors may be mixed within the plastic. The light-transmitting particle 43 is capable of having at least one of the effects of projecting, refracting, and scattering on light, thereby enhancing the effect of the light. In some embodiments, the light-transmitting particle 43 may have different colors so that the light has corresponding colors. In some embodiments, the light-transmitting particle 43 includes at least one of a crystal bead, a silicone bead, a rubber bead, a plastic light-transmitting bead, or a glass bead, and the light-transmitting particle 43 includes plastic fluorescent beads mixed with phosphor.

In some embodiments, the light-transmitting particle 43 is provided with a perforation 431. In some embodiments, the perforation 431 is a through hole. In some embodiments, the at least one flexible LED filament 2 passes through and/or is connected to the perforation 431, and the at least one flexible LED filament 2 may be bent or curved after passing through the perforation 431. In some embodiments, at least one end of each of the plurality of straight LED filaments 30 is connected to the perforation 431, which enables the light-transmitting particle 43 to be utilized to support each of the plurality of straight LED filament 30.

In some embodiments, an outer wall of the light-transmitting particle 43 is connected to each of the plurality of connecting points 4. In some embodiments, the light-transmitting particle 43 may be connected to the each of the plurality of connecting points 4 in a plurality of manners, for example, at least one of soldering, bonding, snap-fitting, etc.

Figure 30:
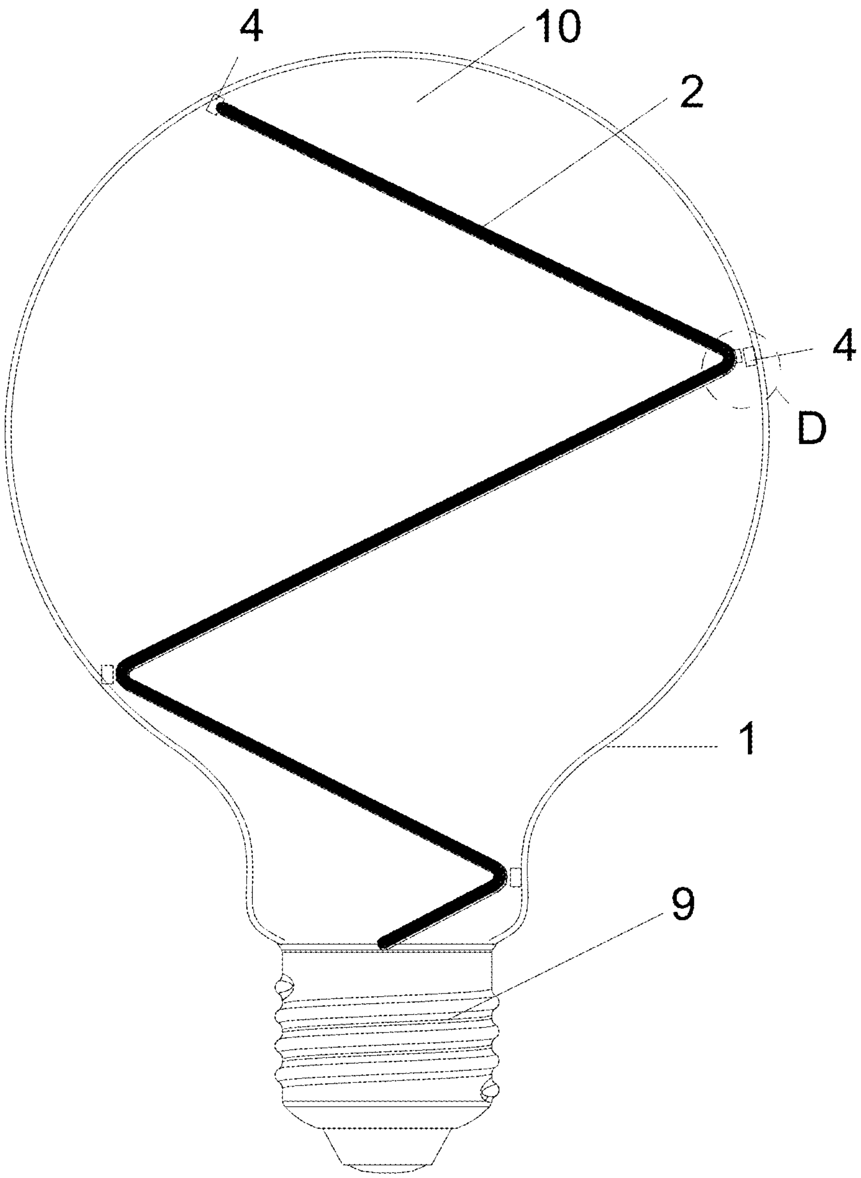
FIG. 30 is a schematic diagram illustrating a connection between a first magnetic suction member and a second magnetic suction member according to some embodiments of the present disclosure.
Figure 31:
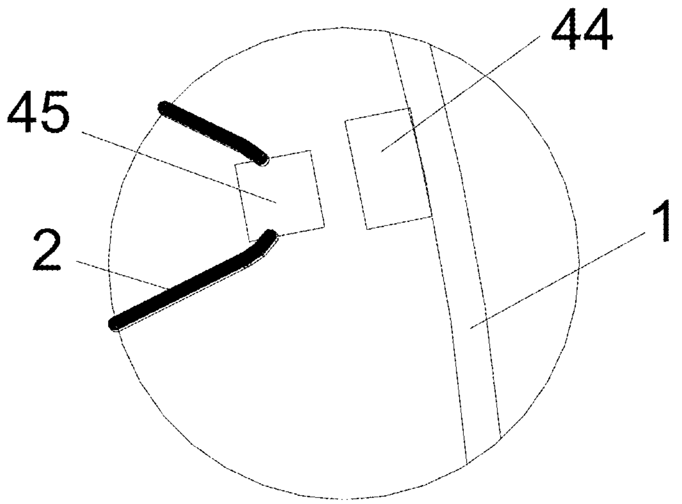
FIG. 31 is an enlarged view of point D in FIG. 30.

FIG. 30 is a schematic diagram illustrating a connection between a first magnetic suction member and a second magnetic suction member according to some embodiments of the present disclosure. FIG. 31 is an enlarged view of point D in FIG. 30.

In some embodiments, as shown in FIG. 30 and FIG. 31, a first magnetic suction member 44 is provided at each of the plurality of connecting points 4, the at least one flexible LED filament 2 is provided with a plurality of second magnetic suction members 45, the plurality of second magnetic suction members 45 are magnetically connected to a plurality of the first magnetic suction members 44

The plurality of the first magnetic suction members 44 and the plurality of second magnetic suction members 45 are capable of being magnetically attracted so that the at least one flexible LED filament 2 is connected to the plurality of connecting points 4. In some embodiments, the plurality of the first magnetic suction members 44 may be disposed on an inside or an outside of the light-transmitting carrier 1 (or the holding cavity 10).

In some embodiments, the plurality of second magnetic suction members 45 are disposed along a length of the at least one flexible LED filament 2. In some embodiments, a distance between two adjacent second magnetic suction members 45 is set as desired.

In some embodiments, the second magnetic suction member 45 is connected to the at least one flexible LED filament 2 in a plurality of manners.

In some embodiments, one side of each of the plurality of second magnetic suction members 45 is bonded to the at least one flexible LED filament 2. For example, one side of each of the plurality of second magnetic suction members 45 is bonded to the at least one flexible LED filament 2 by gluing.

In some embodiments, the each of the plurality of second magnetic suction members 45 is provided with a through hole, and the at least one flexible LED filament 2 is bonded to the second magnetic suction member 45 after penetrating the through hole of the second magnetic suction member 45. By bonding the at least one flexible LED filament 2 to each of the second magnetic suction members 45, it is possible to improve a strength of connection between the at least one flexible LED filament 2 and each of the second magnetic suction members 45 to avoid affecting the installation precision of the at least one flexible LED filament 2.

In some embodiments, one of the first magnetic suction member 44 and the second magnetic suction member 45 includes a permanent magnet, and the other of the first magnetic suction member and the second magnetic suction member includes a permanent magnet or a metal receptor magnet.

By the magnetic suction connection of the first magnetic suction member 44 and the second magnetic suction member 45, it realizes the fast and convenient connection and positioning of the at least one flexible LED filament 2 and the plurality of connecting points 4, and also facilitates the installation and maintenance of the at least one flexible LED filament 2, reducing the complexity of the structure and operation steps required for the traditional fixing manner, and improving the production efficiency and convenience of use.

Figure 32:
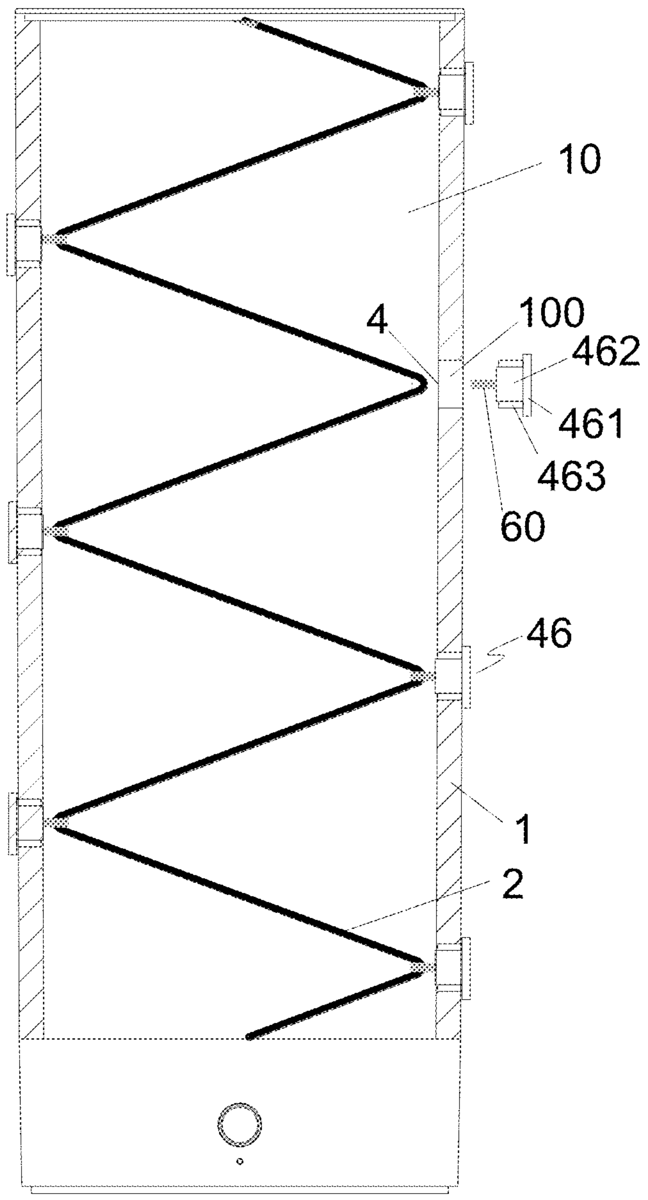
FIG. 32 is a schematic diagram illustrating a connection between a sealing plug and a penetration hole according to some embodiments of the present disclosure.

FIG. 32 is a schematic diagram illustrating a connection between a sealing plug and a penetration hole according to some embodiments of the present disclosure.

In some embodiments, as shown in FIG. 32, the holding cavity 10 is provided with a penetration hole 100 at each of the plurality of connecting points 4, and a sealing plug 46 is provided within the penetration hole 100.

The penetration hole 100 penetrates through a side wall of the light-transmitting carrier 1, and the sealing plug 46 is configured to open or close the penetration hole 100. In some embodiments, at least a portion of the sealing plug 46 may penetrate through the side wall of the light-transmitting carrier 1 and extend into the holding cavity 10.

In some embodiments, a connecting clasp 60 is provided on one side of the sealing plug 46 located inside the holding cavity 10, and the light emitting body 200 is connected to the connecting clasp 60.

The connecting clasp 60 may serve as a connecting point for connecting to the light emitting body 200. In some embodiments, the at least one flexible LED filament 2 is connected to the connecting clasp 60 in a plurality of manners such as at least one of bonding, snapping, or threading connection.

In some embodiments, the sealing plug 46 includes a restriction cap 461, a plug post 462, and a sealing ring 463. In some embodiments, at least a portion of the sealing plug 46 is disposed through the penetration hole 100.

The restriction cap 461 is configured to abut against an outer wall of the light-transmitting carrier 1, thereby restricting the position of the sealing plug 46. In some embodiments, a side of the restriction cap 461 along the axial direction is connected to one end of the plug post 462. In some embodiments, the restriction cap 461 is not able to pass through the penetration hole 100. In some embodiments, the restriction cap 461 may be made of transparent material to avoid forming shadow or be made of non-transparent material to form desired shadow.

The plug post 462 is configured to connect to the penetration hole 100. In some embodiments, the plug post 462 of the sealing plug 46 is threaded through the penetration hole 100. In some embodiments, a connecting clasp 60 is provided at an end of the plug post 462 located within the holding cavity 10.

The sealing ring 463 is sleeved on the plug post 462 to fill the gap between the plug post 462 and the penetration hole 100, thereby playing a sealing role.

By disposing the connecting clasp 60 on the plug post 462, the degree of tension of the at least one flexible LED filament may be adjusted by adjusting the position of the plug post 462, thereby ensuring the stability of the at least one flexible LED filament. The penetration hole 100 are opened in an inner wall of the holding cavity 10 and plugged with the sealing plug 46. When the light-transmitting carrier is made of glass, holes are opened in the glass. If the holes are not plugged, when the light-transmitting carrier receives vibration from the outside world, the light-transmitting carrier is prone to resonance, which results in the light-transmitting carrier being broken. The sealing plug 46 also enhances the sealing of the light-transmitting carrier 1, preventing external dust, water vapor, etc., from entering the holding cavity 10 and affecting the working performance and life of the at least one flexible LED filament 2.

Some embodiments of the present disclosure also provide a plurality of manners of configuring a drive controller and the power supply to adapt to different usage scenarios and needs. For example, the drive controller may be disposed inside or outside a lamp base, constituting a light source circuit and a charging circuit with elements such as a rechargeable lithium battery, a switch, and other components. Alternatively, the drive controller may be disposed inside or outside the light head, constituting a light source circuit with an external power supply, a switch and other components to form a light source circuit.

Figure 33:
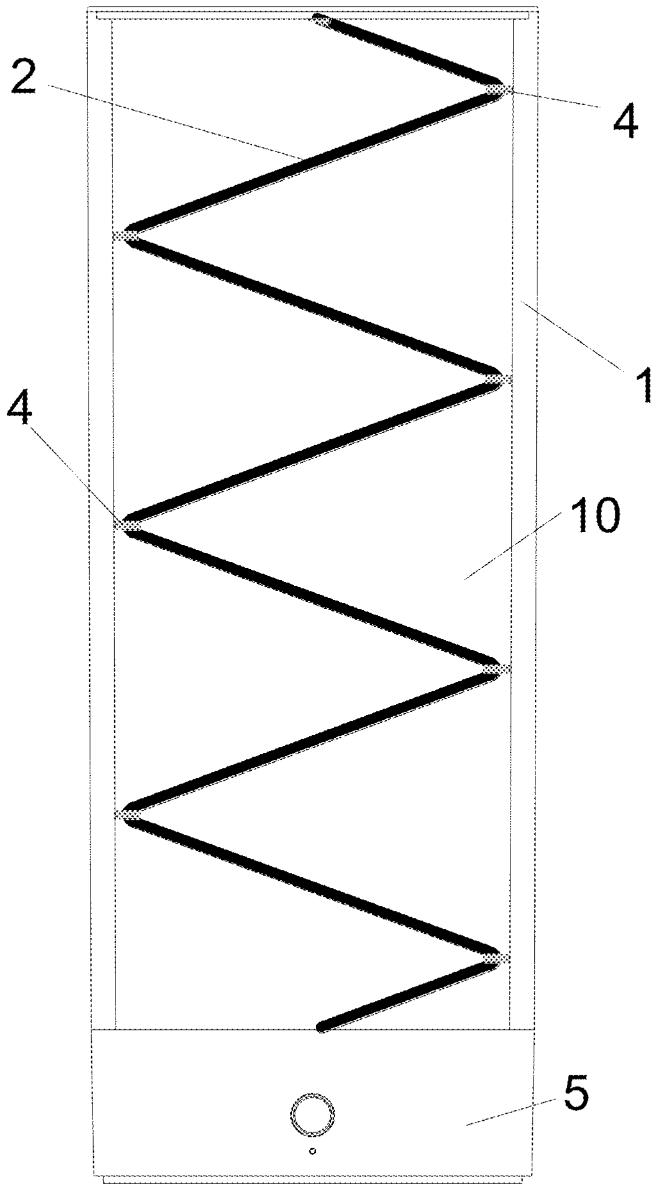
FIG. 33 is a schematic diagram illustrating a structure of a lamp base according to some embodiments of the present disclosure.
Figure 34:
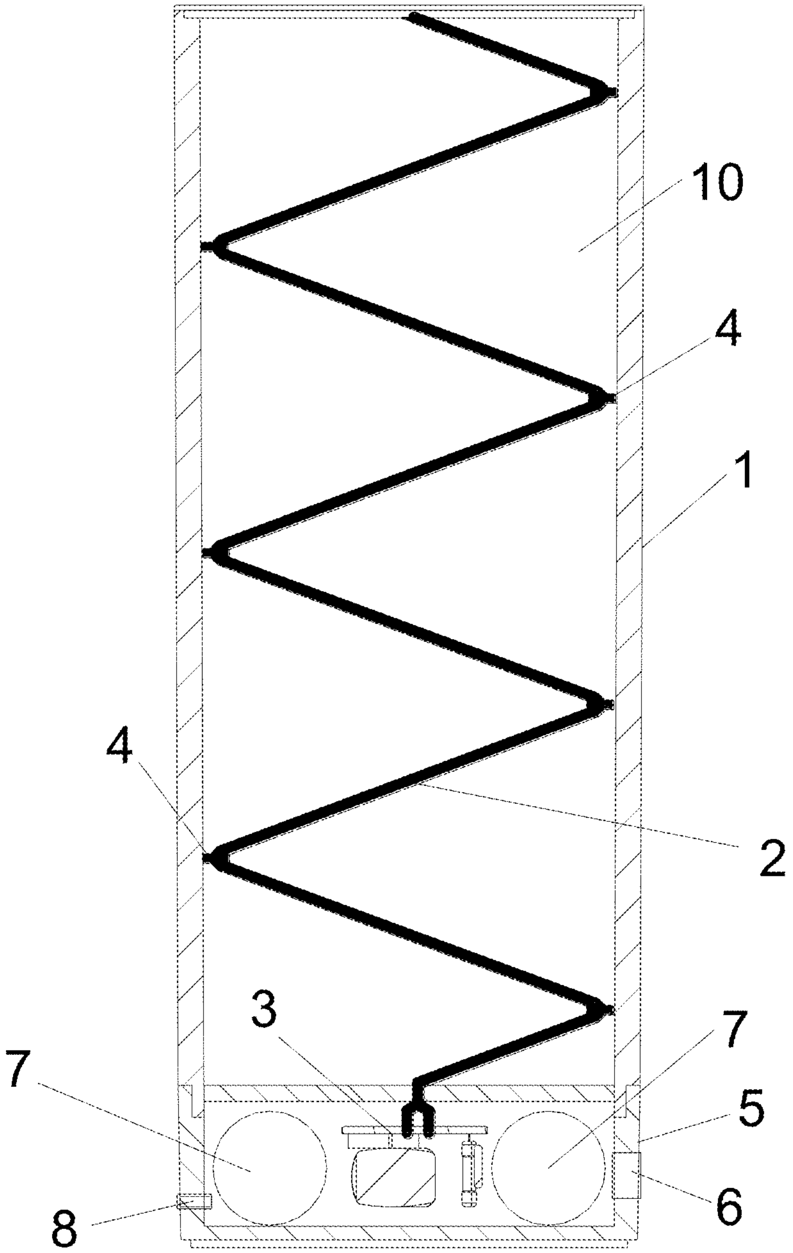
FIG. 34 is a section view of FIG. 33.

FIG. 33 is a schematic diagram illustrating a structure of a lamp base according to some embodiments of the present disclosure. FIG. 34 is a section view of FIG. 33.

In some embodiments, as shown in FIG. 33 and FIG. 34, one side of the light-transmitting carrier 1 is provided with a lamp base 5, and the lamp base 5 is provided with a switch 6, and a drive controller 3, a rechargeable lithium battery 7, and a charging socket 8 are disposed inside or outside lamp base 5.

The lamp base 5 may be configured as a mounting base for mounting the light-transmitting carrier 1. In some embodiments, the lamp base 5 may be disposed below the light-transmitting carrier 1.

The drive controller 3 may be configured to realize control functions. For example, the drive controller 3 may control at least one of duration of the light emission, the flashing frequency, etc. of the light emitting body 200. In some embodiments, the drive controller 3 may include a control circuit and a control chip. The control chip is electrically connected to the control circuit, and the control circuit is electrically connected to the light emitting body 200. A control program may be stored in the control chip.

The rechargeable lithium battery 7 is configured to power the light emitting body 200 and the drive controller 3.

In some embodiments, the rechargeable lithium battery 7, the switch 6, and the light emitting body 200 are electrically connected to the drive controller 3, respectively to form the light source circuit. The light source circuit may be controlled to turn on or off by the switch 6.

The charging socket 8 may be configured to connect a charging connector to charge the rechargeable lithium battery 7.

In some embodiments, the rechargeable lithium battery 7, the charging socket 8, and the drive controller 3 are electrically connected to form a charging circuit.

By setting a lamp base, it is possible to place the light emitting device at a desired position as required. By adopting a rechargeable lithium battery as a power source, it is not necessary to keep the light emitting device connected to a household power source at all times, increasing the applicability range of the light emitting device. The light emitting mode of the light emitting device can be changed by using the drive controller to increase the fun and user experience.

In some embodiments, an external power supply is provided outside the lamp base 5, and the external power supply, the switch 6, and the light emitting body 200 are electrically connected to the drive controller 3 to form a light source circuit.

The external power supply is configured to power the at least one flexible LED filament 2 and the drive controller 3.

In some embodiments, the light head 9 is provided on one side of the light-transmitting carrier 1, as shown in FIG. 1.

The light head 9 is capable of being connected to a power source to form a circuit, thereby energizing the light emitting body 200.

In some embodiments, the light emitting body 200 may be electrically connected to the light head 9. In some embodiments, the light emitting body 200 may be electrically connected to the light head 9 via a drive controller 3 disposed within the light head 9.

Figure 35:
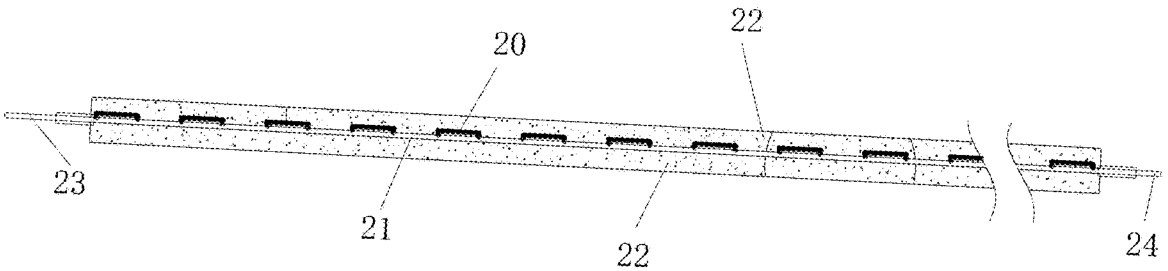
FIG. 35 is a schematic diagram illustrating a structure of a light emitting body according to some embodiments of the present disclosure.
Figure 36:
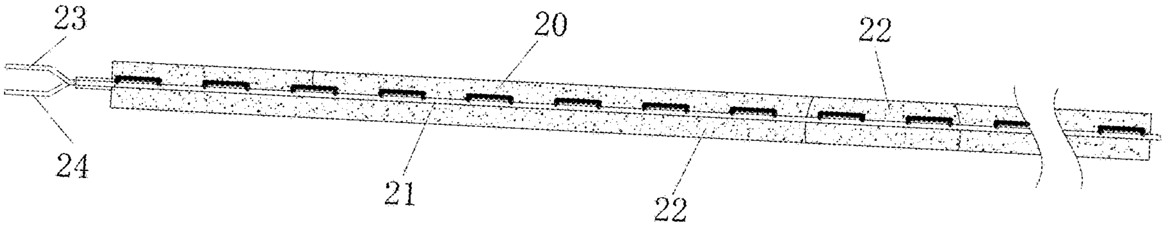
FIG. 36 is a schematic diagram illustrating a structure of a light emitting body according to some embodiments of the present disclosure.

FIG. 35 is a schematic diagram illustrating a structure of a light emitting body according to some embodiments of the present disclosure. FIG. 36 is another schematic diagram illustrating a structure of a light emitting body according to some embodiments of the present disclosure.

In some embodiments, the light emitting body 200 includes a substrate 21, a first light-transmitting adhesive layer 22, and a first light source module, as shown in FIG. 35 and FIG. 36. In some embodiments, the at least one flexible LED filament 2 or the plurality of straight LED filaments 30 includes the substrate 21, the first light-transmitting adhesive layer22, and the first light source module.

The substrate 21 serves as a mounting base for mounting the first light-transmitting adhesive layer 22 and the first light source module.

The first light source module is configured to emit light when energized. In some embodiments, the first light source module includes a positive end and a negative end.

The first light source module includes a plurality of first light emitting chips 20 sequentially connected by conductive lines, and the first light source module is laid along a length direction of the substrate.

The first light emitting chip 20 may emit light when energized. The first light source module formed by the plurality of first light emitting chips 20 connected in sequence may form a strip light source. In some embodiments, the plurality of first light emitting chips 20 are connected between a positive end and a negative end of the first light source module via conductive lines. In some embodiments, the plurality of first light emitting chips 20 may be connected in series, in parallel, or in series-parallel.

The first light-transmitting adhesive layer 22 may be configured to connect the first light source module and the substrate 21. In some embodiments, the first light-transmitting adhesive layer 22 covers the first light source module and wraps around the substrate 21. In some embodiments, the first light-transmitting adhesive layer 22 may be made of a transparent adhesive. In some embodiments, the first light-transmitting adhesive layer 22 may form a stable solid structure after solidifying.

In some embodiments, the substrate 21 is provided with a positive pin 23 and a negative pin 24.

The positive pin 23 and the negative pin 24 are able to be connected to the two poles of the power supply respectively to form a circuit with the power supply.

In some embodiments, the positive pin 23 and the negative pin 24 may be disposed at both ends of the substrate 21. In some embodiments, the positive pin 23 and the negative pin 24 may be disposed at the same end of the substrate 21.

In some embodiments, the positive end of the first light source module is electrically connected to the positive pin 23, and the negative end of the first light source module is correspondingly electrically connected to the negative pin 24.

In some embodiments, when the light emitting body 200 employs the at least one flexible LED filament 2, the substrate 21 is a flexible substrate, and the flexible substrate includes a polyimide film, a polyester film, etc.

In some embodiments, when the light emitting body 200 employs the plurality of straight LED filament 30, the substrate 21 is a straight substrate, and the straight substrate includes a ceramic substrate, a metal substrate, etc.

Figure 37:
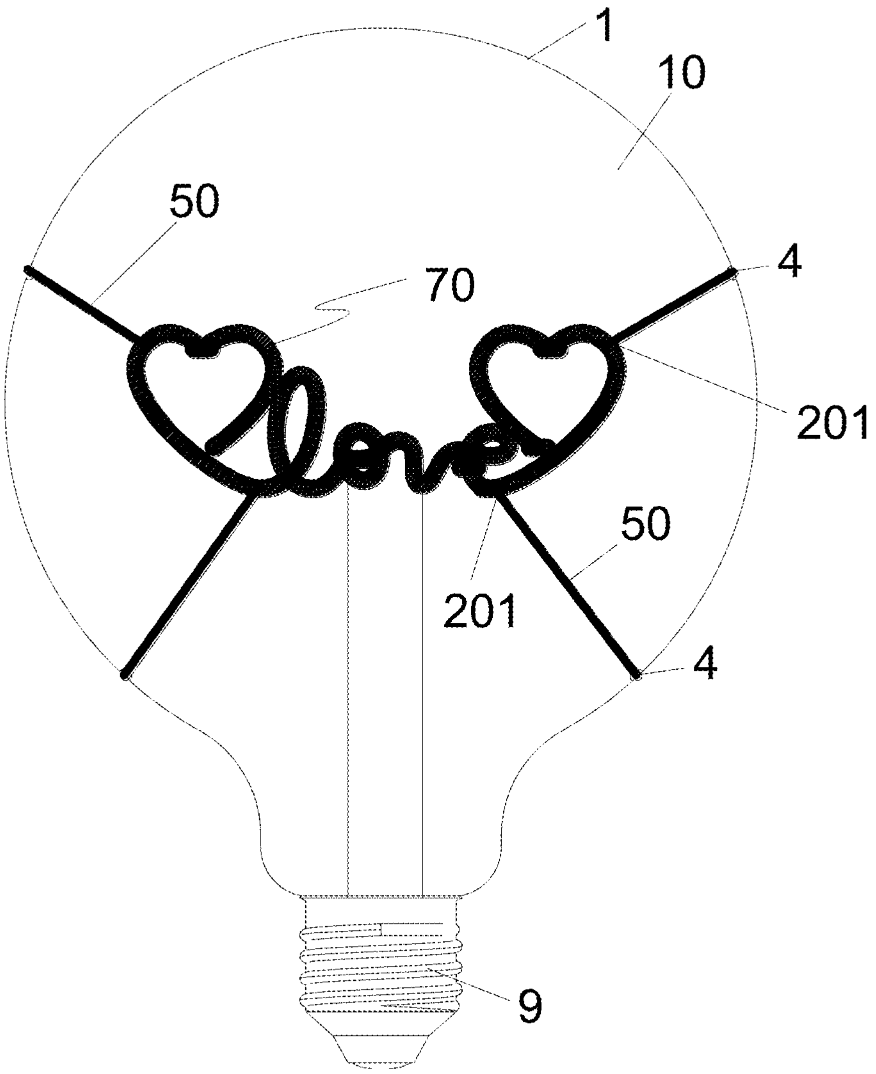
FIG. 37 is a schematic diagram illustrating a structure of a graphic structure according to some embodiments of the present disclosure.
Figure 38:
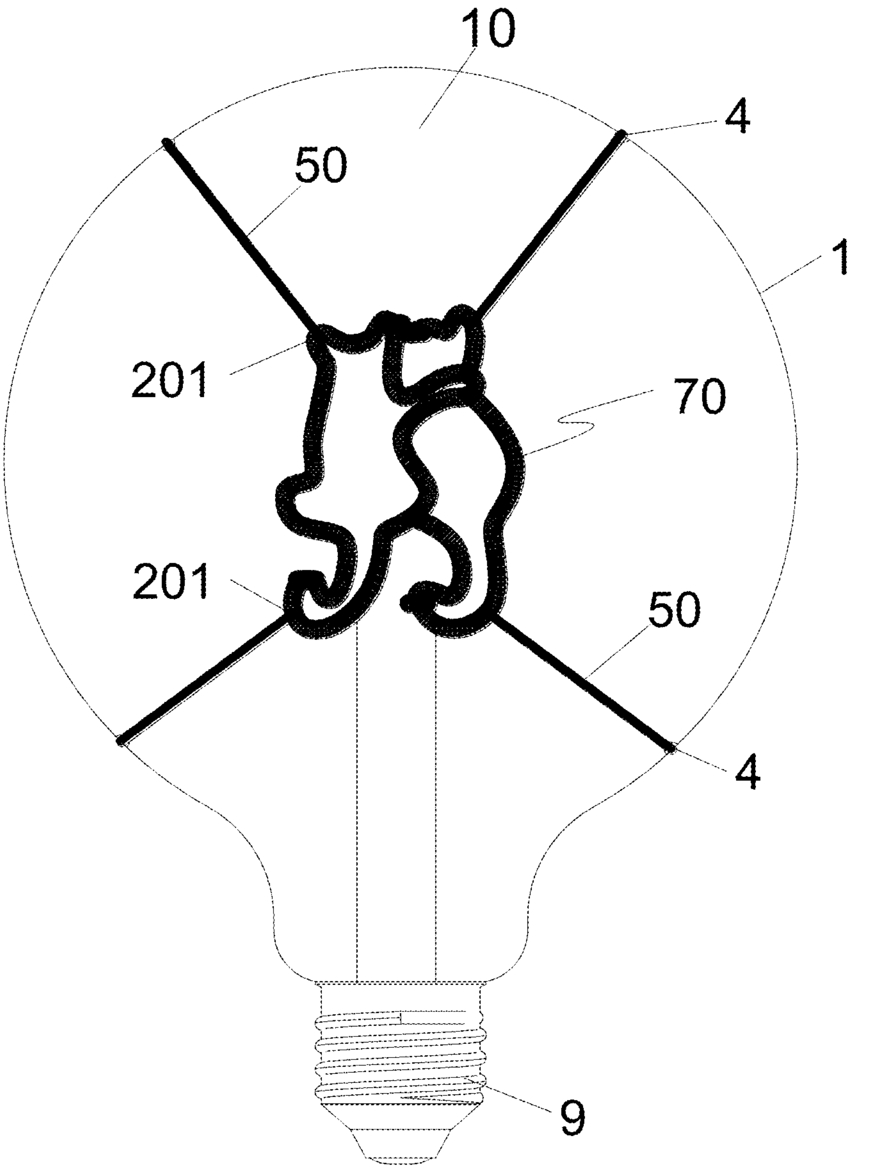
FIG. 38 is another schematic diagram illustrating a structure of a graphic structure according to some embodiments of the present disclosure.
Figure 39:
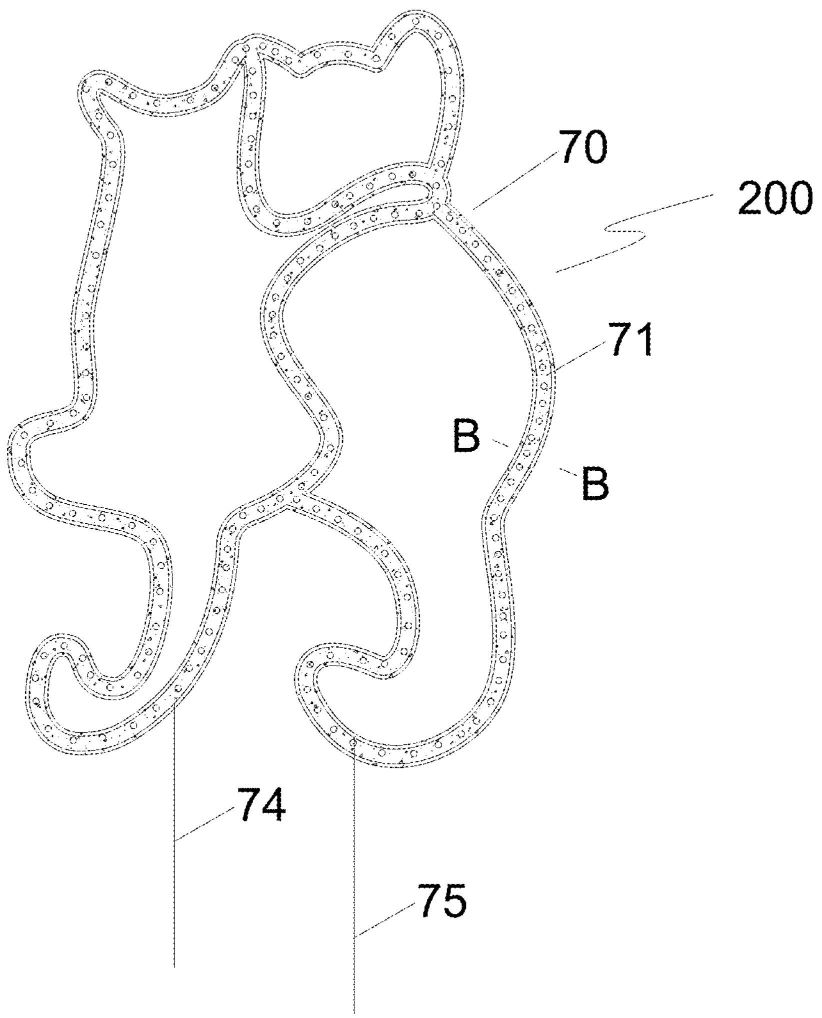
FIG. 39 is another schematic diagram illustrating a structure of a graphic structure according to some embodiments of the present disclosure.
Figure 40:
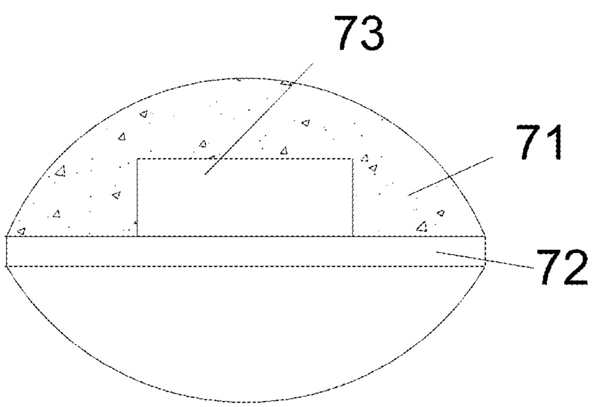
FIG. 40 is another schematic diagram illustrating a structure of a graphic structure according to some embodiments of the present disclosure.

FIG. 37 is a schematic diagram illustrating a structure of a graphic structure according to some embodiments of the present disclosure. FIG. 38 is another schematic diagram illustrating a structure of a graphic structure according to some embodiments of the present disclosure. FIG. 39 is another schematic diagram illustrating a structure of a graphic structure according to some embodiments of the present disclosure. FIG. 40 is another schematic diagram illustrating a structure of a graphic structure according to some embodiments of the present disclosure.

In some embodiments, the light emitting body 200 includes a graphic structure 70, as shown in FIGS. 37-40.

The graphic structure 70 refers to a structure formed by images and/or text. In some embodiments, the graphic structure 70 includes at least one of a three-dimensional graphic, a planar graphic, etc.

In some embodiments, the graphic structure includes a conformal substrate 72, a second light-transmitting adhesive layer 71, and a second light source module. The second light source module includes a plurality of second light emitting chips 73 connected by conductive lines. The second light source module is laid on the conformal substrate 72, and the second light-transmitting adhesive layer 71 covers the second light source module and wraps around the conformal substrate 72. The light emitting body 200 is provided with a positive terminal 74 and a negative terminal 75, and the positive terminal 74 and the negative terminal 75 are electrically connected to the drive controller 3, respectively.

In some embodiments, the conformal substrate 72, the second light-transmitting adhesive layer 71, and the second light source module are similar to the substrate 21, the first light-transmitting adhesive layer 22, and the first light source module, respectively. For more on the conformal substrate 72, the second light-transmitting adhesive layer 71, and the second light source module, see the previous descriptions related to the substrate 21, the first light-transmitting adhesive layer 22, and the first light source module.

In some embodiments, a plurality of pivot points 201 are provided on an outer side of the light emitting body 200, and the plurality of pivot points 201 are connected to the plurality of connecting points 4. In some embodiments, the plurality of pivot points 201 are correspondingly connected to the plurality of connecting points 4 by the hauling wires 50 so as to support the light emitting body 200 within the holding cavity 10. In some embodiments, the light emitting body 200 interacts with the each of the plurality of connecting points 4 and a plurality of support pivots 81 to be restrained and supported within the holding cavity 10.

The light emitting body adopts the graphic structure, and the light emitted by the light emitting body is able to form a plurality of different images, which increases the fun of the light emitting device and user experience.

Figure 41:
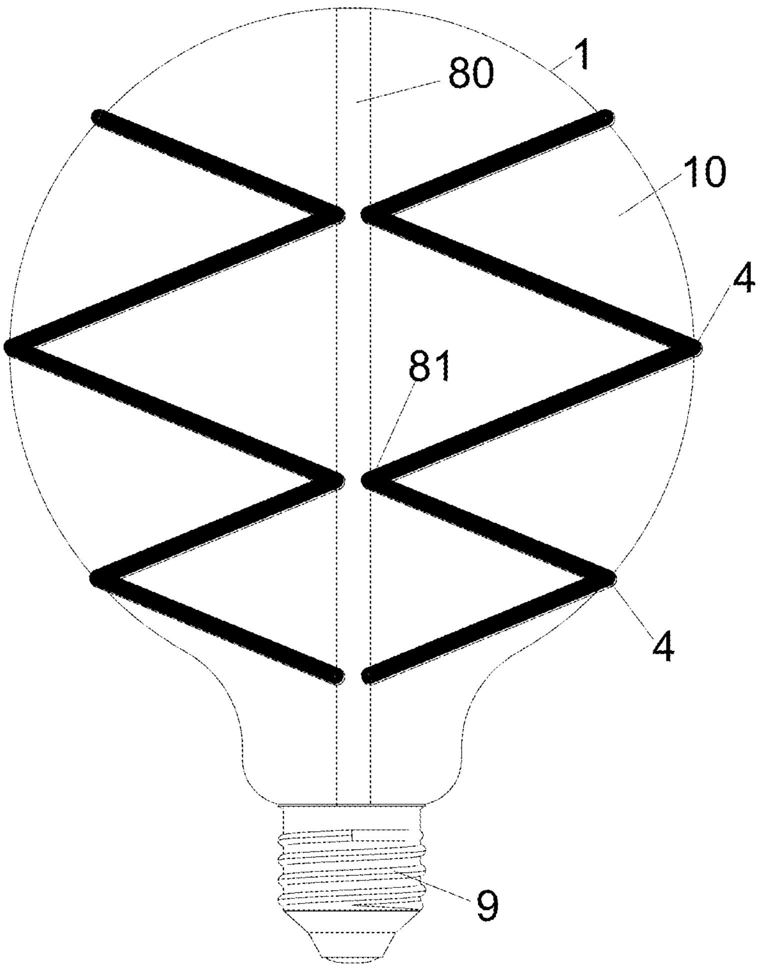
FIG. 41 is a schematic diagram illustrating a structure of a support structure according to some embodiments of the present disclosure.

FIG. 41 is a schematic diagram illustrating a structure of a support structure according to some embodiments of the present disclosure.

In some embodiments, as shown in FIG. 41, a support structure 80 is provided within the light-transmitting carrier 1, and the support structure 80 is provided with the plurality of support pivots 81.

The support structure 80 is a structure provided within the light-transmitting carrier 1 for providing support to the light emitting body 200. In some embodiments, the support structure 80 may include at least one columnar structure. For example, the support structure 80 may be a support column or a support rack. In some embodiments, a plurality of the support structures 80 may be interconnected to form a planar structure or a three-dimensional structure. In some embodiments, the support structures 80 may be made of transparent material to avoid forming shadow. For example, the transparent material may be at least one of glass, transparent plastic, etc.

The plurality of support pivots 81 are capable of being connected to the light emitting body 200, thereby providing support for the light emitting body 200. In some embodiments, the plurality of support pivots 81 are predetermined locations on the support structures 80, which may be selected according to actual needs. The plurality of support pivots 81 arranged at different positions on the support structure 80 may enable the light emitting body 200 to form different structures. In some embodiments, the light emitting body 200 and the plurality of support pivots 81 may be connected in a plurality of manners. For example, the light emitting body 200 and the plurality of support pivots 81 may be connected by at least one of bonding, snap-fitting, welding, etc. In some embodiments, the hauling clasp 40 may be provided at the support pivot 81. For more on the hauling clasp 40, see the related descriptions in FIGS. 12-25.

In some embodiments, at least a portion of the light emitting body 200 is connected to the plurality of connecting points 4 and the plurality of support pivots 81, respectively. In some embodiments, the light emitting body 200 interacts with the each of the plurality of connecting points 4 and the plurality of support pivots 81 to be restrained and supported within the holding cavity 10.

Setting the plurality of support pivots can increase the position of the light emitting body to be supported and make the light emitting body form a more complex structure, which is conducive to improving the fun of the light emitting device and user experience.

Figure 42:
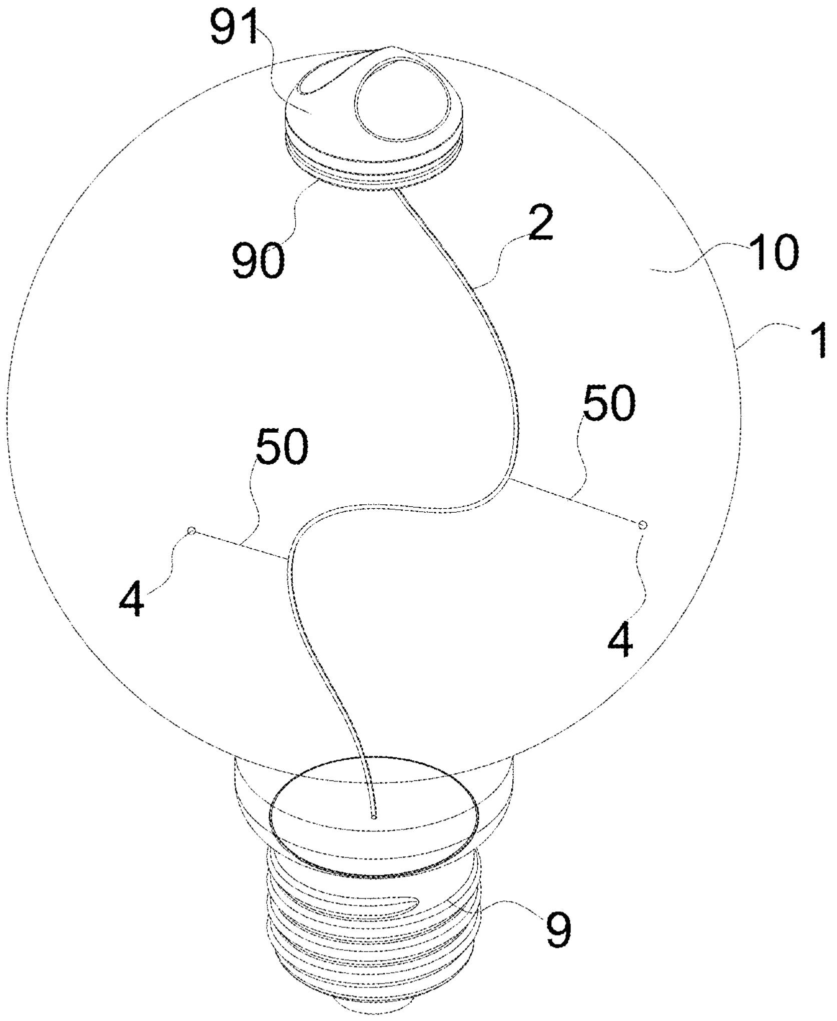
FIG. 42 is a schematic diagram illustrating installation of a sliding member according to some embodiments of the present disclosure.
Figure 43:
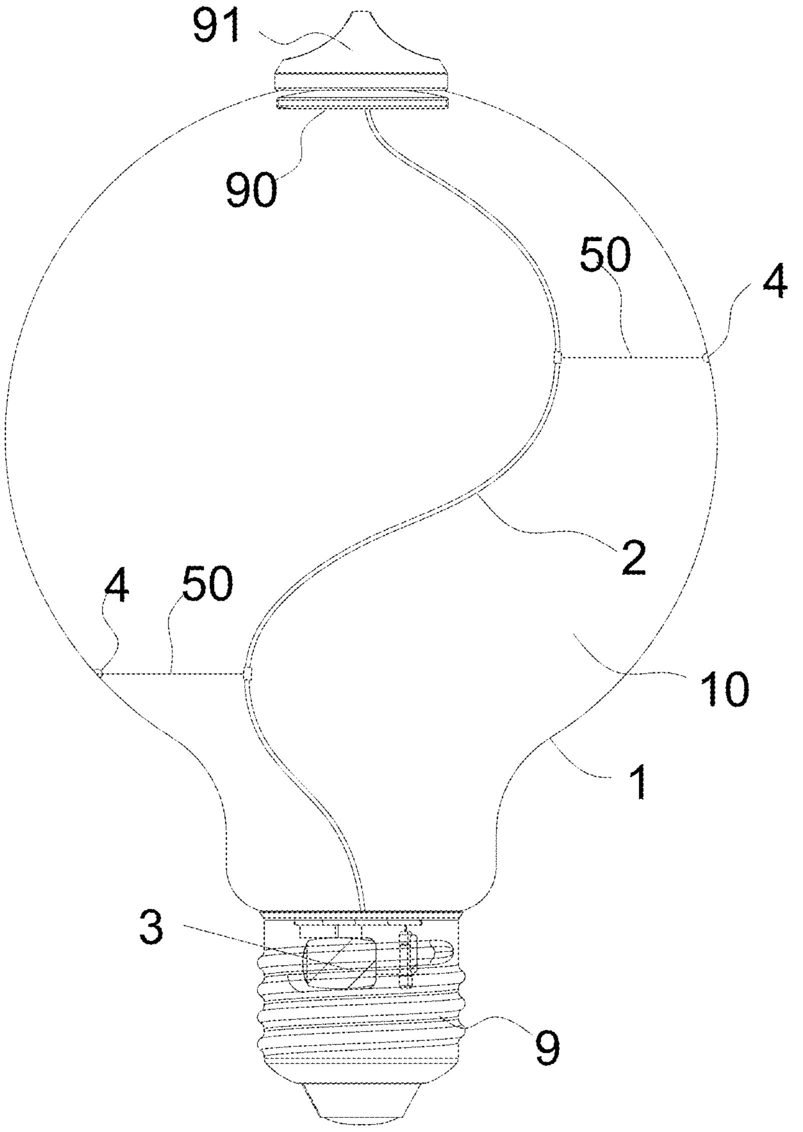
FIG. 43 is a main view of FIG. 42.

FIG. 42 is a schematic diagram illustrating installation of a sliding member according to some embodiments of the present disclosure. FIG. 43 is a main view of FIG. 42.

In some embodiments, the light emitting body 200 includes the at least one flexible LED filament 2, the light emitting body 200 is connected to the each of the plurality of connecting points 4 by the plurality of hauling wires 50 having elasticity, respectively, and one end of the at least one flexible LED filament is electrically connected to the drive controller 3. In some embodiments, the light emitting body 200 is correspondingly restrained to the each of the plurality of connecting points 4 by the plurality of hauling wires 50 having elasticity, and a head end of the at least one flexible LED filament 2 is electrically connected to the drive controller 3.

In some embodiments, as shown in FIG. 42 and FIG. 43, a sliding member 90 is provided on an inner wall of the light-transmitting carrier 1 (or the holding cavity 10), a drive member 91 is provided on an outer wall of the light-transmitting carrier 1 for driving the sliding member along an inner wall of the holding cavity 10.

The sliding member 90 is slidably connected to the inner wall of the light-transmitting carrier 1, and the sliding member 90 may be moved along the inner wall of the light-transmitting carrier 1 when driven by the drive member 91. In some embodiments, a surface of the sliding member 90 in contact with an inner wall of the light-transmitting carrier 1 is a curved surface. In this way, the friction between the sliding member 90 and the inner wall of the light-transmitting carrier 1 can be reduced and wear on the inner wall of the light-transmitting carrier 1 can be reduced.

In some embodiments, the sliding member 90 is magnetically connected to the drive member 91. In some embodiments, a middle or an end of the at least one flexible LED filament 2 is restrained by the sliding member 90, the sliding member 90 and the drive member 91 are magnetically clamped to the wall of the holding cavity 10, and the sliding member 90 and the drive member 91 are respectively provided with a magnetic suction member and a magnetized suction member.

In some embodiments, a third magnetic suction member is provided on a side of the sliding member 90 toward the light-transmitting carrier 1, and a fourth magnetic suction member is provided on a side of the drive member 91 toward the light-transmitting carrier 1. One of the third magnetic suction member and the fourth magnetic suction member is a permanent magnet, and the other of the third magnetic suction member and the fourth magnetic suction member is a permanent magnet or a metal receptor magnet. The sliding member 90 and the drive member 91 may be respectively clamped on an inner side and an outer side of the light-transmitting carrier 1 by attraction of the third magnetic suction member and the fourth magnetic suction member.

In some embodiments, a flexible spacer is provided on a side of the sliding member 90 and/or the drive member 91 toward the light-transmitting carrier 1. The flexible spacer is in contact with a side of the light-transmitting carrier 1, and when the sliding member 90 and/or the drive member 91 moves relative to the light-transmitting carrier 1, it is possible to avoid direct contact between the third magnetic suction member or the fourth magnetic suction member and the light-transmitting carrier 1 to cause wear on the light-transmitting carrier 1, thereby avoiding affecting the light transmittance effect of the light-transmitting carrier 1.

Figure 44:
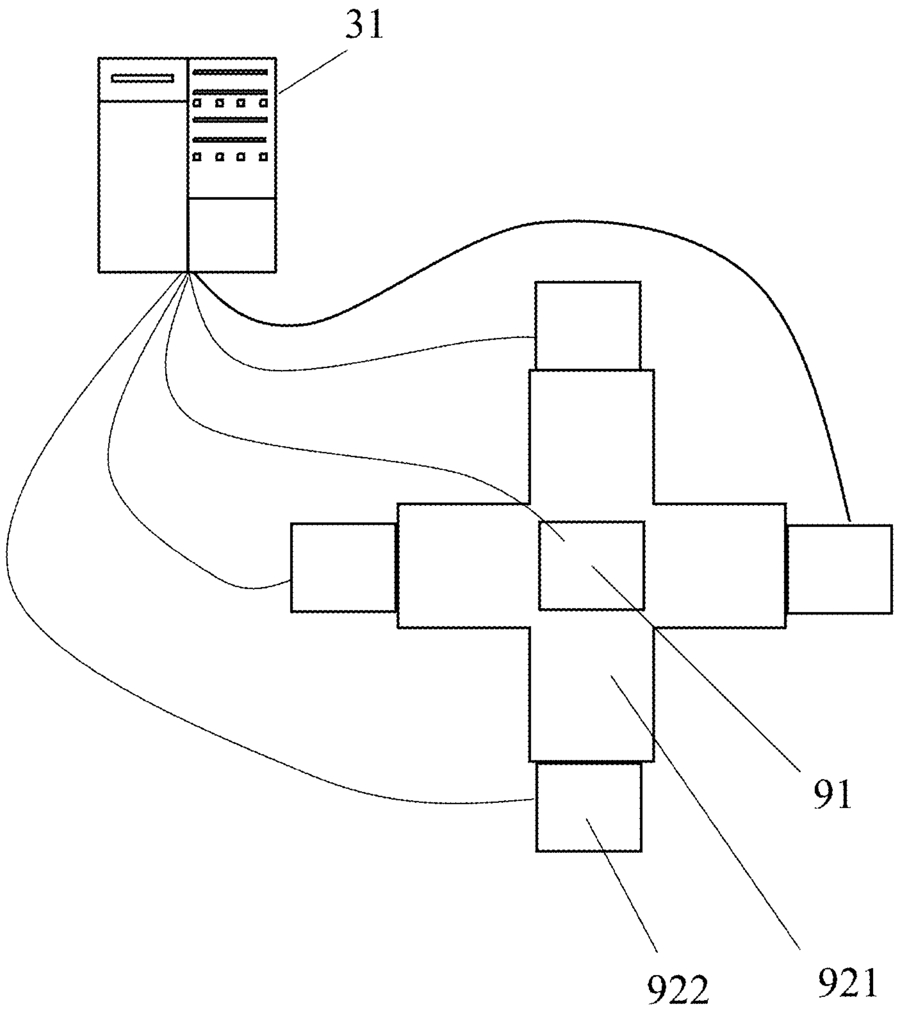
FIG. 44 is a schematic diagram illustrating an application scenario of a microcontroller according to some embodiments of the present disclosure.

In some embodiments, at least a portion of the at least one flexible LED filament 2 is connected to the sliding member 90. When the sliding member 90 moves, the sliding member 90 may drive at least a portion of the at least one flexible LED filament 2 to move, thereby changing the shape of the at least one flexible LED filament 2, or changing the degree of tension of the at least one flexible LED filament 2, so as to change the light effect of the at least one flexible LED filament 2 after emitting light, which is conducive to increasing fun and flexibility of the light emitting device and enhancing the user experience. FIG. 44 is a schematic diagram illustrating an application scenario of a microcontroller according to some embodiments of the present disclosure.

In some embodiments, as shown in FIG. 44, the drive controller 3 may include a microcontroller 31.

The microcontroller 31 is configured to process data and implement control functions. In some embodiments, a drive parameter sequence is preset in the microcontroller 31. The drive parameter sequence is a time-based sequence.

In some embodiments, the drive controller 3 may control the movement of the sliding member 90 based on the drive parameter sequence.

In some embodiments, the drive member 91 may include a plurality of magnetic sub-assemblies. A count of the sliding member 90 is the same as a count of the plurality of magnetic sub-assemblies, and the sliding members 90 are correspondingly magnetically connected to the plurality of magnetic sub-assemblies.

In some embodiments, each of the plurality of magnetic sub-assemblies includes an electromagnet, which has magnetism when energized. By varying the current magnitude corresponding to the each of the plurality of magnetic sub-assemblies, a strength of the magnetic attraction of the each of the plurality of magnetic sub-assemblies to the sliding member 90 may be varied. By changing the current direction corresponding to the each of the plurality of magnetic sub-assemblies, a direction of the magnetic field corresponding to the each of the plurality of magnetic sub-assemblies may be changed, thus utilizing the each of the plurality of magnetic sub-assemblies to drive the sliding members 90 to rotate. In some embodiments, the microcontroller 31 may control the current magnitude and the current direction corresponding to the each of the plurality of magnetic sub-assemblies.

The drive parameter sequence is a sequence composed of current magnitude and current direction corresponding to the plurality of magnetic sub-assemblies.

In some embodiments, the drive parameter sequence may be determined in a plurality of manners based on a stretch margin, a protective margin, and a movement range of the drive member.

For more on the protective margin, see the description of FIG. 26.

The stretch margin refers to a maximum range of deformation of the at least one flexible LED filament 2 during the traction process. The stretch margin and the protective margin may be obtained from the manufacturer or historical data.

The movement range of the drive member may include a maximum movement distance and a maximum rotation angle of the drive member in different directions.

In some embodiments, the drive parameter sequence may be obtained experimentally. For example, the plurality of magnetic sub-assemblies is utilized to start pulling the sliding member 90 from a starting position in a certain direction, in response to damage to a predetermined count of components such as the flexible LED filament 2 and/or the hauling clasp, the traction is stopped, and a termination position of the drive member 91 and the current level and current direction of the plurality of magnetic sub-assemblies are recorded. The distance between the starting position and the termination position of the drive member 91 is recorded as a maximum movement distance of the drive member 91 in the direction from the starting position to the termination position. The direction of traction and a maximum movement distance of the drive member 91 are plotted in a two-dimensional coordinate system. The predetermined count may be predetermined by a person skilled in the art based on experience. For example, the predetermined count may be 90% of a count of components such as the flexible LED filament 2 and/or the hauling clasp.

Repeating the above process, the processor may obtain a two-dimensional coordinate system diagram of the maximum movement distance of the drive member 91 in a plurality of directions, which may further obtain a plurality of maximum movement distances and a plurality of maximum rotation angles of the drive member 91 in different directions, and the current magnitude and the current direction of the corresponding plurality of magnetic sub-assemblies to constitute the drive parameter sequence.

In some embodiments, an external processor is utilized to predict, based on a drive model, damage risk values corresponding to the plurality of maximum movement distances and the plurality of maximum rotation angles of the drive member 91 in different directions. Drive parameters corresponding to the prediction results are used as a drive parameter sequence and input into the microcontroller. The external processor is disposed outside the light emitting device and is communicatively connected to the light emitting device, which may be configured to analyze and process the data and realize the control function based on the preset program.

The drive model is a model configured to determine a damage risk value. In some embodiments, the drive model may be a machine learning model. For example, the drive model is the Neural Network (NN) model.

In some embodiments, an input of the drive model may include a dimension of the light-transmitting carrier 1, a filament characteristic, the stretch margin, the protective margin, and a candidate movement range, and an output of the drive model may include the damage risk value.

The filament characteristic may include the size and the material of the flexible LED filament.

The candidate movement range refers to data selected from the plurality of maximum movement distances and the plurality of maximum rotation angles of the drive member 91 in different directions. For example, the data formed by the combination of the maximum movement distances and the maximum rotation angles in eight different directions.

The damage risk value is data used to assess the possibility of damage to the flexible LED filament and/or the hauling clasp. In some embodiments, the damage risk value may be a value between 0 and 1. The greater the damage risk value, the greater the possibility of damage to the flexible LED filament 2 and/or the hauling clasp are.

In some embodiments, the training process of the drive model may be performed by the external processor. After the drive model is trained, the drive model may be input into the microcontroller.

In some embodiments, the external processor may acquire a training dataset, the training dataset includes a plurality of first training samples and a plurality of first labels corresponding to first training samples. The external processor may perform a plurality of rounds of iterations, the at least one round of iterations including: selecting the one or more first training samples from the training dataset, inputting the one or more first training samples into the initial drive model, obtaining the one or model prediction output corresponding to the one or more first training samples, calculating a value of the loss function by substituting the model prediction outputs and the first labels into a formula for a predefined loss function, and inversely updating model parameters of the initial drive model based on the value of the loss function. The update may be performed by a plurality of manners. For example, the update may be performed based on a gradient descent manner. When the end-of-iteration condition is satisfied, the iteration is ended, and the trained drive model is obtained. The end-of-iteration condition may be that the loss function converges, a count of iterations reaches a threshold, etc.

The first training samples may include size of the sample light-transmitting carrier, sample filament characteristic, sample stretch margin, sample protective margin, and movement range of sample drive member. The first labels may include sample damage risk value.

In some embodiments, first training samples and first labels may be determined based on inspection results before leaving the factory. For example, a performance of a sample light emitting device needs to be tested before leaving the factory, and after the sample drive member drives the sample sliding member in a certain direction to move a certain distance, a predetermined percentage of the components such as the flexible LED filament and/or the hauling clasp of the sample light emitting device are damaged, and then the distance is determined as a maximum movement distance in the direction. When the distance of the sample drive member in the direction is not less than the maximum movement distance, the first label corresponding to the sample drive member is set to 1. When the distance of the sample drive member in the direction is less than the maximum movement distance, the first label corresponding to the sample drive member is set to a value between 0 and 1, a specific size of which may be equal to the probability of damage to components such as the flexible LED filament and/or the hauling clasp.

In some embodiments of the present disclosure, using the microcontroller to drive the sliding member based on the drive parameter sequence not only realizes precise positioning and fine regulation of the movement of the sliding member, but also makes the movement range of the drive member smaller than the maximum movement distance of the maximum rotation angle of the drive member, reducing the problem of damage to components such as filaments and/or the hauling clasp due to excessive movement of the drive member, and further improving the durability of the light emitting device.

In some embodiments, the light emitting device may further include a limit member.

The limit member is configured to limit the movable range of the drive member 91 to avoid moveable range of the drive member 91 beyond the maximum movement distance or the maximum rotation angle. In some embodiments, the limit member may be disposed on an outer side of the light-transmitting carrier 1 in a plurality of manners. For example, the limit member may be disposed on an outer side of the light-transmitting carrier by at least one of bonding, snap-fitting, etc.

In some embodiments, a channel 921 and a plurality of magnetic assemblies 922 are provided within the limit member as shown in FIG. 44. The drive member 91 are movably disposed within the channel 921. In some embodiments, the channel 921 may include a straight channel, a cross-shaped channel, etc. The plurality of magnetic assemblies 922 may be configured to attract the drive member 91 to control the movement of the drive member 91 within the channel 921, and when the drive member 91 is moving, it drives the sliding member 90 by magnetic attraction. In some embodiments, the drive member 91 may be a permanent magnet.

In some embodiments, the plurality of magnetic assemblies 922 may include electromagnets. In some embodiments, the plurality of magnetic assemblies 922 may be arranged in a plurality of manners, and different magnetic assemblies 922 may generate suction or repulsion forces on the drive member 91 from different directions to drive the drive member 91 to move and/or rotate. In some embodiments, the plurality of magnetic assemblies 922 may be communicatively connected to the microcontroller 31. The microcontroller 31 may control the current magnitude or the current direction of the different magnetic assemblies 922 based on the drive parameter sequence.

In some embodiments of the present disclosure, the limit member can limit the movement range of the drive member 91 within the channel, thereby avoiding the movement range of the drive member 91 exceeding the movement maximum distance or the maximum rotation angle, avoiding an excessive movement range of the drive member 91 that results in damage to components such as the flexible LED filament and/or the hauling clasp, and improving the durability of the light emitting device.

Figure 45:
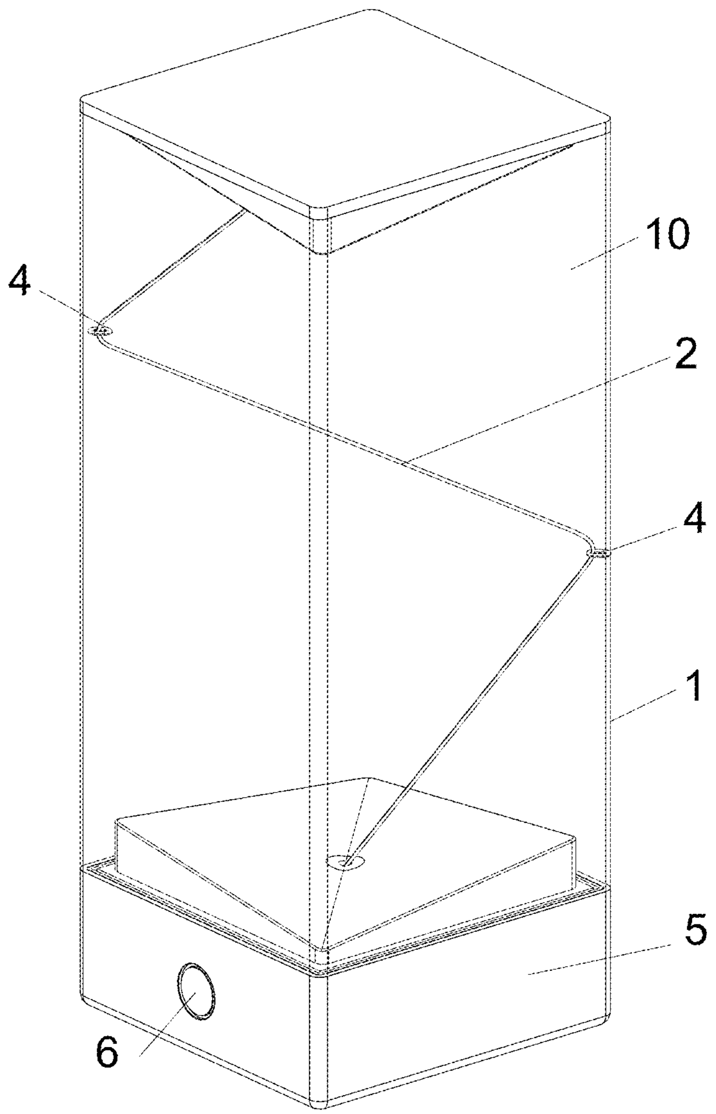
FIG. 45 is another schematic diagram illustrating a structure of a light emitting device according to some embodiments of the present disclosure.
Figure 46:
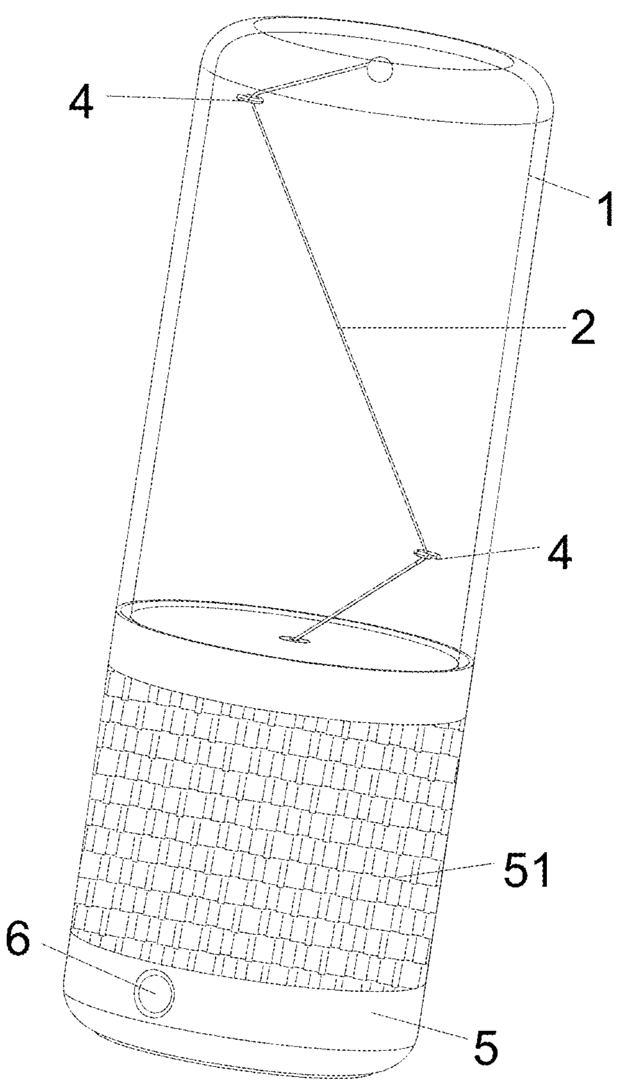
FIG. 46 is another schematic diagram illustrating a structure of a light emitting device according to some embodiments of the present disclosure.

FIG. 45 is another schematic diagram illustrating a structure of a light emitting device according to some embodiments of the present disclosure. FIG. 46 is another schematic diagram illustrating a structure of a light emitting device according to some embodiments of the present disclosure.

In some embodiments, as shown in FIG. 45, assembling the light emitting device includes following operations.

In operation S1, preparing the light-transmitting carrier 1, the at least one flexible LED filament 2, the plurality of connecting points 4, the drive controller 3, the rechargeable lithium battery 7, the charging socket 8, the patch 41, the switch 6, and the necessary bonding materials and wires, etc. The light-transmitting carrier 1 is the glass blister, the plastic blister, or the plastic light transmitting cover, etc., and the connecting point 4 is provided with the hauling clasp 40.

In operation S2, installing the drive controller, setting the lamp base 5 on one side of the light-transmitting carrier 1 such as the bottom of the light-transmitting carrier 1, and installing the drive controller 3 inside the lamp base 5, at the same time, mounting the switch 6 on the lamp base 5 to control a switching state of the lamp.

In operation S3, arranging the plurality of connecting points, according to the design requirements, applying an appropriate amount of adhesive material, e.g., a UV shadowless adhesive, at each designated position of the plurality of connecting point 4 on the inner wall of the holding cavity 10 of the light-transmitting carrier 1, and curing and bonding the hauling clasp 40 and the connecting point 4 by curing with UV light irradiation at the designated location.

In operation S4, installing the at least one flexible LED filament, and electrically connecting one end of the at least one flexible LED filament 2 to the drive controller 3 via a wire; then, sequentially wrapping or passing the other end of the at least one flexible LED filament 2 around or through the each hauling clasp 40 according to a designed path, and adjusting the shape and position of the at least one flexible LED filament 2 according to the actual needs during the winding process to achieve the desired lighting effect; finally, fixedly connecting the end of the at least one flexible LED filament 2 to the hauling clasp 40 on the last patch 41 to ensure its stability within the light-transmitting carrier 1.

In operation S5, completing the circuit connection, electrically connecting the rechargeable lithium battery 7, the charging socket 8, the switch 6, and the at least one flexible LED filament 2 to the drive controller 3, and constituting a complete light source circuit and charging circuit. All connections are ensured to be firm and reliable, without no short circuits or circuit breaks.

In operation S6, encapsulating and testing, encapsulating the open portion of the light-transmitting carrier 1 to ensure sealing and safety of the light emitting device; then, performing power on testing on the light emitting device, and checking whether the luminous effect of the flexible LED filament 2 to meet the design requirements. Adjustments and optimizations may be made based on the test results according to actual needs.

In some embodiments, as shown in FIG. 46, a Bluetooth speaker 51 may also be arranged within the lamp base 5, the Bluetooth speaker 51 being powered by the rechargeable lithium battery 7.

In some embodiments, when assembling the light emitting device, assembling the light-transmitting particles 43 at the plurality of connecting points 4 may include following operations.

In operation S10, preparing materials such as the light-transmitting carrier 1, the at least one flexible LED filament 2, the light-transmitting particle 43, the drive controller 3, the power supply and the necessary bonding materials and wires, etc.

In operation S20, arranging the light-transmitting particle, including: applying an appropriate amount of adhesive material, e.g., a UV shadowless adhesive, to the inner wall of the holding cavity 10 of the light-transmitting carrier 1 or the outer wall of the light-transmitting particle 43, and curing and bonding the light-transmitting particle and the corresponding connecting point by UV light irradiation at a specified position. Each light-transmitting particle 43 is provided with the perforation 431 for the at least one flexible LED filament 2 to pass through.

In operation S30, installing the at least one flexible LED filament, including: after electrically connecting one end of the at least one flexible LED filament 2 to the drive controller 3, the at least one flexible LED filament 2 passing through the perforation 431 on a first light-transmitting particle 43 and passing through each light-transmitting particle 43 in accordance with the preset paths, and finally, fixedly connecting the end of the at least one flexible LED filament 2 to a last light-transmitting particle 43. In the process of passing through the light-transmitting particle, the shape and position of the at least one flexible LED filament 2 may be flexibly adjusted according to the actual needs to realize rich lighting effects.

In operation S40, completing the circuit connection and encapsulation test, including: electrically connecting the rechargeable lithium battery 7, the charging socket 8, the switch 6, and the at least one flexible LED filament 2 to the drive controller 3, constituting a complete light source circuit and charging circuit. All connections are ensured to be firm and reliable, without no short circuits or circuit breaks.

The light emitting device provided in some embodiments of the present disclosure realizes the free shaping and precise positioning of the at least one flexible LED filament in a three-dimensional space or a plane through the restraining connection between the hauling clasp 40 and the inner wall of the holding cavity 10 of the light-transmitting carrier 1, thus breaking through the limitations of the traditional fixed arrangement and significantly improving the visual effect and artistic expression of the light fixture.

The basic concepts have been described above, and it is apparent to those skilled in the art that the foregoing detailed disclosure is intended as an example only and does not constitute a limitation of this disclosure. While not expressly stated herein, a person skilled in the art may make a plurality of modifications, improvements, and amendments to this disclosure. Those types of modifications, improvements, and amendments are suggested in this disclosure, so those types of modifications, improvements, and amendments remain within the spirit and scope of the exemplary embodiments of this disclosure.

Also, the disclosure uses specific words to describe embodiments of the disclosure, for example, "an embodiment", "one embodiment", and/or "some embodiment" means a feature, structure, or characteristic associated with at least one embodiment of the present disclosure. Accordingly, it should be emphasized and noted that two or more references in this disclosure, at different locations, to "one embodiment" or "an embodiment" or "an alternative embodiment" in different places in this disclosure do not necessarily refer to the same embodiment. In addition, certain features, structures, or characteristics in one or more embodiments of the present disclosure may be suitably combined.

Finally, it should be understood that the embodiments described in this disclosure are only configured to illustrate the principles of the embodiments of this disclosure. Other deformations may also fall within the scope of this disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A light emitting device, comprising a light-transmitting carrier and a light emitting body, the light-transmitting carrier being formed with a holding cavity, a plurality of connecting points being disposed on an inner wall of the holding cavity, and the light emitting body being disposed within the holding cavity by connecting with each of the plurality of connecting points.

2. The light emitting device of claim 1, wherein the light emitting body includes at least one flexible light emitting diode (LED) filament, the at least one flexible LED filament being wrapped around each of the plurality of connecting points, and respectively connected to each of the plurality of connecting points to be disposed within the holding cavity; or the light emitting body includes a plurality of straight LED filaments connected to each other in series, in parallel, or in series-parallel, each of the plurality of straight LED filaments being connected to the holding cavity through the plurality of connecting points.

3. The light emitting device of claim 2, wherein the at least one flexible LED filament is in a tensioned state.

4. The light emitting device of claim 2, wherein the light emitting body is welded or bonded to the plurality of connecting points.

5. The light emitting device of claim 2, wherein each of the plurality of connecting points is provided with a hauling clasp, the light emitting body passing through and/or connecting to the hauling clasp.

6. The light emitting device of claim 5, wherein the hauling clasp is connected to the each of the plurality of connecting points via a patch.

7. The light emitting device of claim 5, wherein the hauling clasp is connected to the each of the plurality of connecting points by a hauling wire, the hauling wire comprising a resilient connector or a rigid connecting post.

8. The light emitting device of claim 7, wherein one end of the hauling wire is connected to the hauling clasp, and the other end of the hauling wire is connected to the each of the plurality of connecting points via a patch.

9. The light emitting device of claim 7, wherein the hauling clasp includes at least one of a pulling hook, a ring clasp, or a curved sleeve;

the at least one flexible LED filament threading through and/or connecting to at least one of the pulling hook, the ring clasp, or the curved sleeve at the each of the plurality of connecting points;

wherein the curved sleeve is provided with an arcuate channel for threading the at least one flexible LED filament.

10. The light emitting device of claim 2, wherein the each of the plurality of connecting points is connected with a light-transmitting particle;

the light-transmitting particle is provided with a perforation;

an outer wall of the light-transmitting particle is attached to the each of the plurality of connecting points;

the light-transmitting particle comprises at least one of a crystal bead, a silicone bead, a rubber bead, a plastic light-transmitting bead, or glass bead;

the at least one flexible LED filament threads through and/or connects to the perforation; or at least one end of each of the plurality of straight LED filaments is connected to the perforation.

11. The light emitting device of claim 1, wherein the light-transmitting carrier is provided with a lamp base on one side;

the lamp base is provided with a switch;

the lamp base is provided with a drive controller, a rechargeable lithium battery, and a charging socket;

the rechargeable lithium battery, the switch, and the light emitting body are electrically connected to the drive controller to form a light source circuit;

the rechargeable lithium battery and the charging socket are electrically connected to the drive controller to form a charging circuit; or an external power supply is provided outside the lamp base;

the external power supply, the switch, and the light emitting body are electrically connected to the drive controller to form a light source circuit.

12. The light emitting device of claim 1, wherein the light-transmitting carrier is provided with a light head on one side;

the light emitting body is electrically connected to the light head; or the light emitting body is electrically connected to the light head via a drive controller disposed within the light head.

13. The light emitting device of claim 2, wherein a first magnetic member is provided at the each of the plurality of connecting points;

the at least one flexible LED filament is provided with a plurality of second magnetic members;

the plurality of second magnetic members are magnetically connected to a plurality of first magnetic members;

one side of each of the plurality of second magnetic members is bonded to the at least one flexible LED filament; or each of the plurality of second magnetic members is provided with a perforation, and the at least one flexible LED filament is bonded to the second magnetic member after penetrating the perforation of the second magnetic member;

one of the first magnetic member and the second magnetic member includes a permanent magnet, and the other of the first magnetic member and the second magnetic member includes a permanent magnet or a metal receptor magnet.

14. The light emitting device of claim 2, wherein the holding cavity is provided with a penetration hole at the each of the plurality of connecting points, and a sealing plug is provided within the penetration hole;

a connecting clasp is provided on one side of the sealing plug disposed inside the holding cavity; and the light emitting body is connected to the connecting clasp.

15. The light emitting device of claim 14, wherein the sealing plug comprises a restriction cap, a plug post, and a sealing ring, at least a portion of the sealing plug is penetrated into the penetration hole;

one side of the restriction cap along an axial direction is connected to one end of the plug post;

the sealing ring is sleeved on the plug post;

the sealing ring is hermetically connected to the penetration hole; and the connecting clasp is provided at an end of the plug post disposed within the holding cavity.

16. The light emitting device of claim 2, wherein the light emitting body comprises a substrate, a first light-transmitting adhesive layer, and a first light source module;

the first light source module comprises a plurality of first light emitting chips sequentially connected by conductive lines, the first light source module is laid along a length direction of the substrate, and the first light-transmitting adhesive layer covers the first light source module and encapsulates onto the substrate;

the substrate is provided with a positive pin and a negative pin; and a positive end of the first light source module is electrically connected to the positive pin, and a negative end of the first light source module is electrically connected to the negative pin.

17. The light emitting device of claim 1, wherein the light emitting body comprises a graphic structure;

the graphic structure comprises a conformal substrate, a second light-transmitting adhesive layer, and a second light source module;

the second light source module comprises a plurality of second light emitting chips connected by conductive lines;

the second light source module is laid on the conformal substrate, and the second light-transmitting adhesive layer covers the second light source module and encapsulates onto the conformal substrate;

the light emitting body is provided with a positive terminal and a negative terminal, and the positive terminal and the negative terminal are electrically connected to a drive controller respectively; and a plurality of pivot points are provided on an outer side of the light emitting body, and the plurality of pivot points are connected to the plurality of connecting points.

18. The light emitting device of claim 1, wherein a support structure is provided within the light-transmitting carrier;

the support structure is provided with a plurality of support pivots; and at least a portion of the light emitting body is connected to the plurality of connecting points and the plurality of support pivots, respectively.

19. The light emitting device of claim 1, wherein the light emitting body comprises at least one flexible LED filament;

the light emitting body is connected to the each of the plurality of connecting points by a plurality of hauling wires having elasticity, respectively;

one end of the at least one flexible LED filament is electrically connected to a drive controller;

a sliding member is provided on an inner wall of the light-transmitting carrier;

a drive member is provided on an outer wall of the light-transmitting carrier for driving the sliding member to move along an inner wall of the holding cavity; and at least a portion of the at least one flexible LED filament is connected to the sliding member; and the sliding member is magnetically connected to the drive member.

20. The light emitting device of claim 1, wherein the light emitting body forms a planar structure or a three-dimensional structure.

* * * * *